US006411623B1

United States Patent
DeGollado et al.

(10) Patent No.: US 6,411,623 B1
(45) Date of Patent: Jun. 25, 2002

(54) SYSTEM AND METHOD OF AUTOMATED TESTING OF A COMPRESSED DIGITAL BROADCAST VIDEO NETWORK

(75) Inventors: Leonard DeGollado, Silver Spring, MD (US); Karl J. Kuhn, Haymarket, VA (US); Leung P. Lee, Potomac, MD (US); John Mark Zetts, Falls Church, VA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/221,864

(22) Filed: Dec. 29, 1998

(51) Int. Cl.[7] ................................................ H04L 12/26
(52) U.S. Cl. ...................... 370/395.1; 370/486; 370/241
(58) Field of Search ................................ 370/395, 486, 370/242, 247, 251, 252, 535, 352, 353, 354, 401, 241; 348/423.1, 180, 192, 194

(56) References Cited

U.S. PATENT DOCUMENTS

| | | |
|---|---|---|
| 4,313,135 A | 1/1982 | Cooper |
| 4,780,755 A | 10/1988 | Knierim |
| 4,963,967 A | 10/1990 | Orland et al. |
| 4,969,041 A | 11/1990 | O'Grady |

(List continued on next page.)

Primary Examiner—Douglas Olms
Assistant Examiner—Ken Vanderpuye

(74) Attorney, Agent, or Firm—Joseph C. Redmond, Jr.; Richard A. Tonlin, Esq.; Morgan & Finnegan, LLP

(57) ABSTRACT

A switched, digital high-broadband network provides automated control and in-service and out-of-testing of analog video signals, encoded and decoded real time, into MPEG 2 digitized format with a high level of security and protection of content and without attendant degradation of the analog signal sometimes experienced in satellite transmissions. The switch network, typically an asynchronous transfer mode (ATM) network, has multiple gateways for connection to video signal sources and sinks. Each gateway includes an analog/digital video switch for receiving the video signals and distributing them to an MPEG 2 encoder for conversion into digital packets. A multiplexer is coupled to the encoder and a digital switch for inserting the multiplexed signal into the switched ATM network. The multiplexer and the digital switch encode destination address information into the digital packets to ensure proper routing. Each gateway further includes a de-multiplexer and MPEG 2 decoder connected to the digital switch for separating the digital packets from the ATM network into separate MPEG 2 streams subsequently decoded into analog video and returned to the video sinks. A command and control center is coupled to each gateway for remote testing of point-to-point and point-to-multipoint circuits; testing a switch circuit before and after the establishment of a connection to a customer; in service testing of MPEG 2 encoding content; detecting and isolating digital network problems, and off-line network testing and automating network utilization. The command and control center includes test executives which ensure the quality and availability of video traffic. The test executives run continuously run without manual intervention providing network operators with network status through user consoles.

21 Claims, 27 Drawing Sheets

U.S. PATENT DOCUMENTS

| | | |
|---|---|---|
| RE33,535 E | 2/1991 | Cooper |
| 5,040,081 A | 8/1991 | McCutchen |
| 5,243,424 A | 9/1993 | Emmett |
| 5,274,446 A | 12/1993 | Ashida |
| 5,327,237 A | 7/1994 | Gerdes et al. |
| 5,446,492 A | 8/1995 | Wolf et al. |
| 5,506,832 A | 4/1996 | Arshi |
| 5,555,364 A | 9/1996 | Goldstein |
| 5,557,333 A | 9/1996 | Jungo et al. |
| 5,559,559 A | 9/1996 | Jungo et al. |
| 5,572,247 A | 11/1996 | Montgomery |
| 5,572,261 A | 11/1996 | Cooper |
| 5,572,570 A * | 11/1996 | Kuenzig ............... 379/1 |
| 5,574,500 A | 11/1996 | Hamada et al. |
| 5,585,858 A | 12/1996 | Montgomery |
| 5,587,743 A | 12/1996 | Montgomery |
| 5,596,364 A | 1/1997 | Wolf et al. |
| 5,617,148 A | 4/1997 | Montgomery |
| 5,654,751 A | 8/1997 | Richard, III |
| 5,663,766 A | 9/1997 | Sizer |
| 5,663,962 A * | 9/1997 | Caire et al. ............. 370/535 |
| 5,686,965 A * | 11/1997 | Auld ..................... 348/423 |
| 5,812,756 A * | 9/1998 | Taylor |
| 6,219,357 B1 * | 4/2001 | Ishikawa ............... 370/535 |

* cited by examiner

IBM: amolsky

Order Reservation 630

Reservation ID: 1A5E    Reservation Status: Confirmed

Title: Evening News — 650

Start Date: 02 01 98    Start Time: 19 00    ☐ Recurring Event
month day year           hours mins
                                                  [ ▼ ]
Stop Date: 02 01 98     Stop Time: 19 30     ○ Every Day
month day year           hours mins           ○ Every ☐ Day Origin Port:   Telco #:   Local Loop:   Duration: 00:30:00 — 625
NYACB9         945573     TV1XU3

Dest. Port(s): Telco #:   Local Loop:      ☐ Insurance
WASACB2        968843     TV1ASD             [ ▼ ] mins Format: NTSC
                                           Profile: 4:2:0

Comments: Primary feed out of New York

[Submit]   [Quit]

640

[Print]  [X]

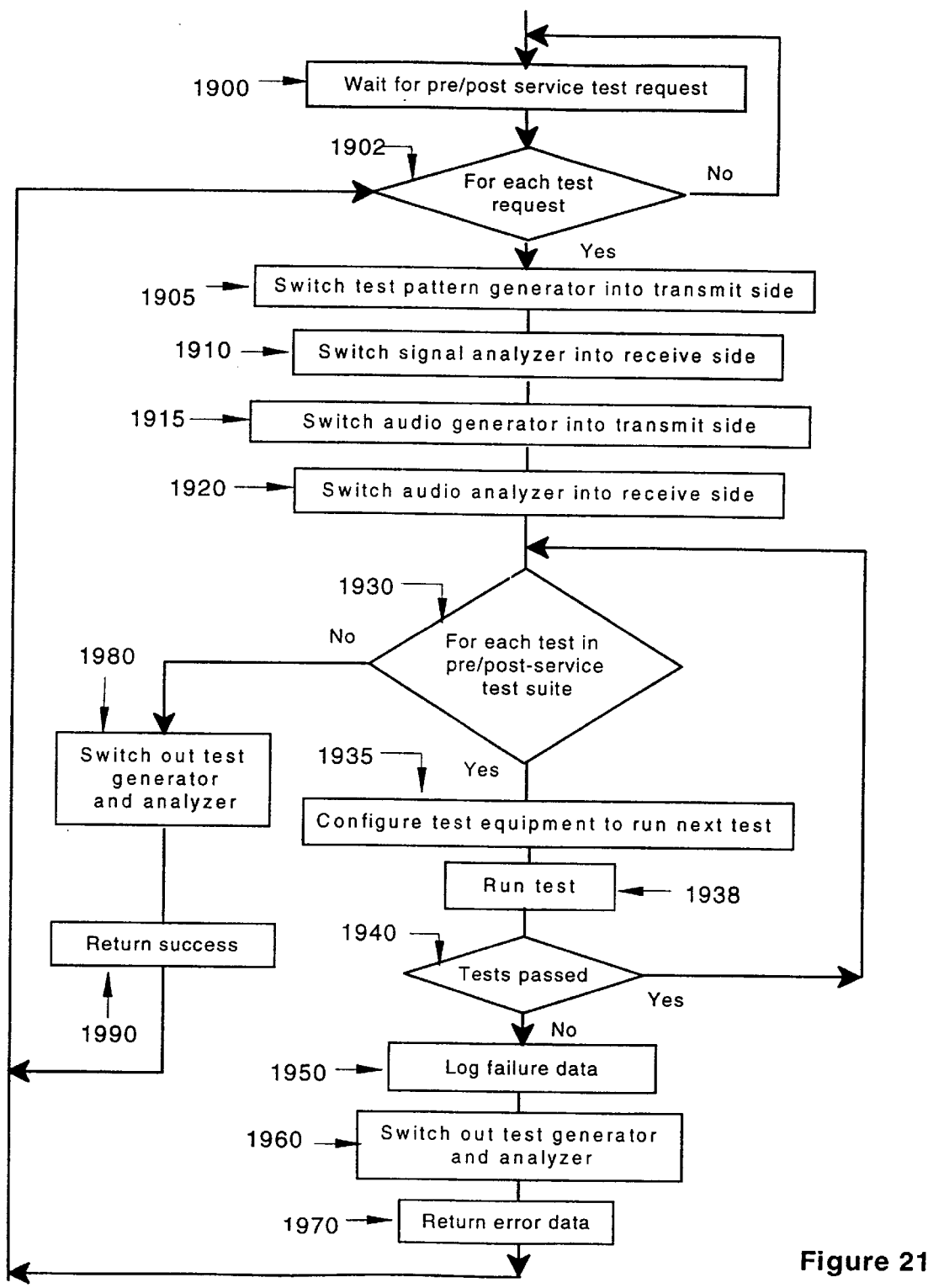

SYSTEM AND METHOD OF AUTOMATED TESTING OF A COMPRESSED DIGITAL BROADCAST VIDEO NETWORK

RELATED APPLICATIONS

The present invention is related to applications entitled 'SYSTEM AND METHOD OF IN-SERVICE TESTING OF A COMPRESSED DIGITAL BROADCAST VIDEO NETWORK', Ser. No. 09/221,865 filed Dec. 29, 1998 now U.S. Pat No. 6, 297,845 and 'SYSTEM AND METHOD OF IN-SERVICE AUDIO/VIDEO SYNCHRONIZATION TESTING', Ser. No. 09/221,868, filed Dec. 29, 1998 both dockets assigned to the same assignee as that of the present invention and fully incorporated herein by reference.

BACKGROUND OF THE INVENTION

(1) Field of the Invention

The present invention relates generally to video data transmission systems and more particularly to the control of communication networks and the measurement of video quality.

(2) Description of the Prior Art

An IBM Video System (IVS) includes a high-bandwidth, switched network connecting 6 cities in the continental United States that is used by broadcasters to transmit and receive broadcast video. The system converts a subscriber's analog or digital video to compressed digital format, then routes it to the destination over an asynchronous transfer mode (ATM) switched connection where the digital video is decompressed, converted back into analog or digital video and passed on to the receiving end. The video signal is compressed using MPEG-2 encoding format at a bit rate of 8–40 Mbps using real-time encoding and, in many cases, it is played out directly to air.

Using ATM as a backbone enables IVS to offer point to multipoint capability that is of value to the broadcast video industry. A single broadcast feed originating in New York City may be simultaneously routed to Los Angeles, Chicago and Atlanta. The ATM network provides subscribers with a high level of security and protection of content.

Typically, a broadcaster reserves in advance IVS network bandwidth for a given time slot. Immediately prior to the requested time, a connection(s) is established through the ATM network and the circuit is turned over to the broadcaster. At the end of the purchased time slot, the circuit is automatically disconnected.

Subscribers gain access to the IVS network via gateways referred to as Points-Of-Presence (POPS). All command and control are accomplished from a remotely located Command and Control Operations Center (CAC). There is no local control at the pops which are unmanned by designed. The volume of traffic, the intricacies of controlling network resources and the speed at which connections must be established preclude manual control of the network by operators. Operator intervention is far too cumbersome to achieve the necessary circuit connect/disconnect times. Network operations must be fully automated to provide the level of service expected by subscribers and to operate the network economically.

Broadcast engineers are a demanding customer set with exacting standards for video quality and availability of service. Since the subscriber's feed is broadcast directly to air via the IVS network, any degradation or interruption of video signal will be obvious to television viewers and may result in a significant loss of revenue to the broadcaster. In a communications network, the carrier is responsible for demonstrating that the circuit it is providing meets applicable engineering standards. The carrier is further responsible for isolating transmission anomalies so that the network can be eliminated as the possible source or cause of the perturbation.

Because the network points-of-presence are unmanned, circuit testing in the IVS network is problematic. Although the techniques of EIA/TIA 250 C in-service testing are well known to broadcasters and remote testing is commonplace within the communications industry, testing is always accomplished with an engineer at one of the two sites involved in the circuit under test. Other carriers do not perform remote testing of terrestrial point-to-multipoint digital video circuits. Video quality testing is required of each and every circuit in the network prior to release to the subscriber. These tests cannot have a duration longer than a few seconds and if a failure is encountered, another circuit must be established. All circuit reservations are guaranteed and connection provisioning must be completed prior to the reservation start time.

In addition to pre-service circuit testing, each circuit is periodically tested while the feed is active and once again prior to disconnection. This non-invasive monitoring of video and audio quality detects problems near-real time so that service may be restored with minimum outage. It is common practice in the broadcast industry to record the on-air feed and subscribers are able to provide evidence of circuit degradation. In-service testing indemnifies the network should a subscriber claim network culpability for any such circuit anomaly.

Operating in a network using real-time MPEG-2 compression and ATM routing can cause perturbations not normally seen in a non-compressed digital and even analog network. Such problems as video tiling or breakup, loss of video and audio synchronization, audio clipping, dropouts and video freeze frames require a wider range of tests to be run to ensure the network is not distorting the broadcast.

Quiesced hardware such as encoders, decoders, switch ports, etc. and idle ATM trunks, referred to hereafter as network resources, must be regularly tested to ensure availability. Future reservations are guaranteed based on this availability and when hardware failures are detected, the network resource database must be updated to reflect the loss of such components. Loss of resources that affect reservations in the near term requires network management software to recalculate the resource allocation necessary to honor those reservations. Lastly, as maintenance actions at the POPs are completed, diagnostic testing must be executed to verify the fix and update the network resource database to reflect the change in status.

For quality assurance and to minimize outages on high priority video circuits, video feeds must continuously be monitored by operations personnel in a round-robin fashion. This monitoring must be accomplished without manual intervention and must provide an accurate indication of what the subscriber is actually seeing.

Prior art related to remote out-of-service and in-service testing of a video transmission system without human intervention includes the following:

U.S. Pat. No. 5,506,832 (Arshi et al.) issued Apr. 9, 1996, discloses a method of testing a computer-based client/server conferencing system. A digitized video and voice data signal is sent from a server to a client that essentially checks the connectivity of the circuit. No test is performed for quality and user intervention is required to start the test.

U.S. Pat. No. 5,274,446 (Ashida) issued Dec. 28, 1993, discloses an internal self-diagnosis of an image transmission device that processes digital video. Circuit loop backs are employed throughout the device for isolating failures to a component. The diagnostic capability is limited to the device itself. No test signals are sent to the remote end which precludes testing of the transmission network. User intervention is required to initiate the self test.

U.S. Pat. No. 5,446,492/U.S. Pat. No. 5,596,364 issued Aug. 29, 1995, and Jan. 21, 1997 respectively, disclose a system and method for measuring the video quality of transmission channels. The quality is measured by the audio delay, the video delay and perceptual degradation in video quality using extracted signals from the source and destination audio-visual signals in the transmission channel which does not include a switched digital ATM network. These signals are easily and quickly communicated between source and destination locations.

Accordingly, a need exists for in-service and out-of-service testing without human intervention in high bandwidth, switched network video transmission systems.

SUMMARY OF THE INVENTION

An object of the invention is a set of software executives that automate testing of a compressed digital video network precluding the need for -manual intervention.

Another object is a set of software test executives which update the network resource and reservation databases as components of the network malfunction or undergo repair action.

Another object is a set of software test executives which automatically perform periodic in-service testing of active video feeds in a non-invasive, non-service affecting manner.

Another object is a set of software test executives which will automatically, and without operator intervention, reconfigure circuits to restore service to video feeds that fail in-service testing.

Another object is a set of software test executives which perform problem isolation to a failing system component when a test failure occurs.

Another object is a set of software test executives which periodically route video feeds into a Command And Control (CAC) center for real-time monitoring of video and waveform quality.

These and other objects, features and advantages are accomplished in a switched, digital high-broadband network which provides automated control and testing of analog video signals, encoded and decoded real time, into MPEG 2 digitized format with a high level of security and protection of content and without attendant degradation of the analog signal sometimes experienced in satellite transmissions. The switch network, typically an asynchronous transfer mode (ATM) network, has multiple gateways for connection to video signal sources and sinks. Each gateway includes an analog/digital video switch for receiving the video signals and distributing them to an MPEG 2 encoder for conversion into digital packets. A multiplexer is coupled to the encoder and a digital switch for inserting the multiplexed signal into the switched ATM network. The multiplexer and the digital switch encode destination address information into the digital packets to ensure proper routing. Each gateway further includes a de-multiplexer and MPEG 2 decoder connected to the digital switch for separating the digital packets from the ATM network into separate MPEG 2 streams subsequently decoded into analog video and returned to the video sinks.

A command and control center is coupled to each gateway for remote testing of point-to-point and point-to-multipoint circuits; testing a switch circuit before and after the establishment of a connection to a customer; in service testing of MPEG 2 encoding content; detecting and isolating digital network problems, and off-line network testing and automating network utilization. The command and control center includes test executives which ensure the quality and availability of video traffic. The test executives run continuously run in parallel with network operations and reservation management software. The test executives both query and update the network resource and reservation databases. Testing is divided into two categories, in-service (IS) and out-of-service (OOS) testing. Although detailed test data are made available, operator consoles and logs provide pass/fail indications for ease of operability. To facilitate field maintenance actions and in-depth troubleshooting, the executives allow operators to take manual control of testing. A video feed monitor (VFM) routes all video feeds to a studio monitor and a waveform monitor/vectorscope in the CAC for quality assurance purposes. Each feed is viewed for 15 seconds at a time in serial fashion with the feed name displayed in graphics for identification. In this manner, a bank of 4 video and 4 waveform monitor/vectorscopes can assure 16 video feeds per minute.

BRIEF DESCRIPTION OF THE DRAWINGS

The invention will be understood from the following description of a preferred embodiment taken in conjunction with an appended drawing, in which:

FIG. 5 is an illustration of a Reservation Order web page for the system of FIG. 1.

FIG. 21 is a logic flow diagram of the pre/post-service circuit testing.

DETAILED DESCRIPTION OF THE PREFERRED EMBODIMENT

Figure 1:
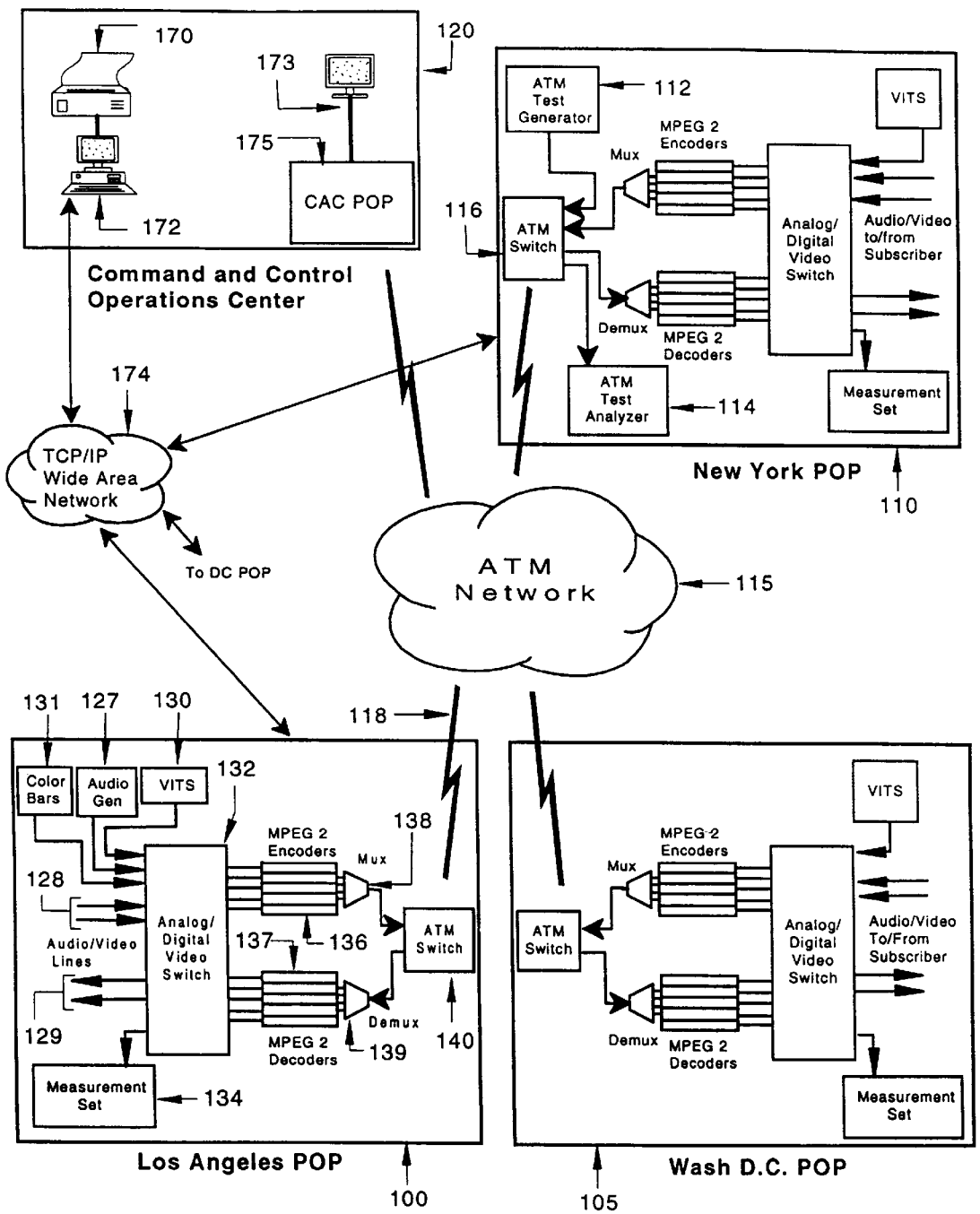
FIG. 1 is a simplified network diagram illustrating 3 sites or points-of-presence (POPs) and their configuration in a video transmission system controlled by a Command And Control (CAC) center incorporating the principles of the present invention.

In FIG. 1, there are illustrated 3 points-of-presence (POP) or gateways into the IBM Video Service (IVS) Network, New York 110, Los Angeles 100 and Washington DC 105. The IVS network provides long distance services for high bandwidth, broadcast quality video and audio by digitizing and compressing the analog/digital video signal and transmitting it to the ran distant end via a switched asynchronous transfer mode (ATM) network where it is converted back to analog or digital format and passed on to the subscriber.

The 3 POPs are connected to an ATM network 115 through OC-3 (155 Mbps) access lines 118 from an ATM switch 140. Each POP has a set of ingress/egress access lines that carry the video signal to 129 and from 128 nearby subscriber locations. The POP accepts video in either analog or digital (ITU-R601 General Digital Video and SMPTE 259M 270 Mbps Serial) form. The access lines are connected to an analog/digital switch 132 that allows the signals to be switched into dedicated MPEG-2 encoders 136 and decoders 137. The POP interfaces with the ATM network via an ATM switch 140. On the transmit side, ATM switch is connected to a mux 138 which multiplexes the output of the MPEG-2 encoders into a single OC-3 transport stream. Network data that is addressed to the POP is routed into the demux 139 that demultiplexes the OC-3 data into individual MPEG-2 transport streams. The output access lines 129 provide the signal to the subscriber. FIG. 1 is offered only as a representation of a POP configuration. Traffic load dictates the full complement of networking resources.

To test the video quality of each newly established video circuit, a vertical interval test signal (VITS) generator 130, an audio signal generator 127 and a video/audio measurement set 134 are wired into the analog/digital switch 132. A color bars generator 131 is also connected to a switch port in order to inject the color bar test pattern into all outbound (egress) lines. This assures the subscriber that there is continuity with the POP. The testing of the ATM switch and ATM trunks necessitates an ATM test generator 112 and an ATM test analyzer 114. These test sets characterize the performance of the ATM switch and network.

Because the POPs are unmanned, they are remotely controlled from a Command and Control (CAC) Operations Center 120 located in New York. Video connections are established and broken by commands issued under program control of network operations software executing in computers 172. These computers maintain continuous connections to each POP over a TCP/IP wide area network 174 to both control the POP equipment and monitor for alarm conditions. The CAC itself contains a small POP 175 since it accesses the ATM network in order to monitor video feeds 173 for quality assurance.

Figure 2:
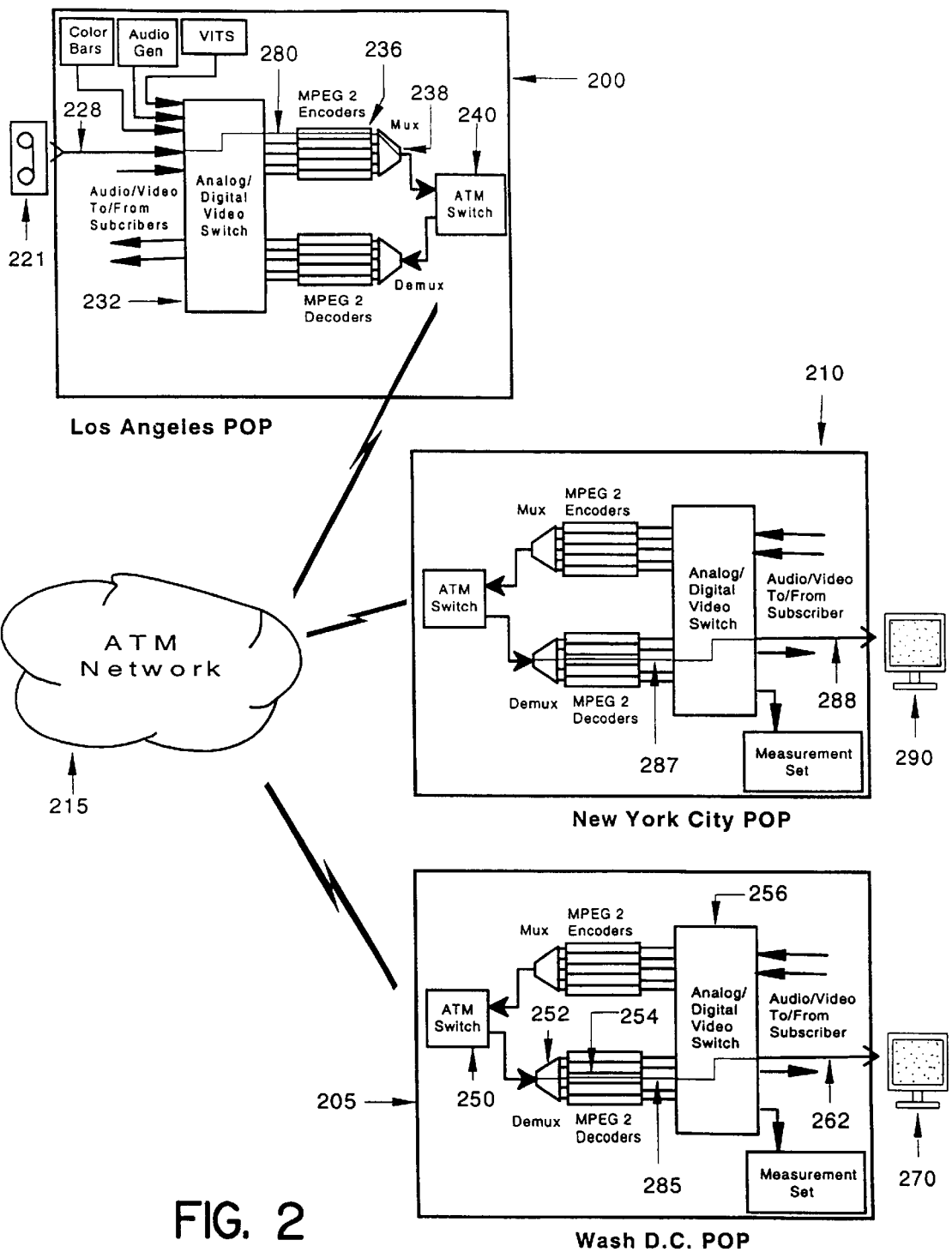
FIG. 2 depicts the connection path of a point-to-multipoint video circuit originating in Los Angeles and terminating in Washington DC and New York.

FIG. 2 depicts a point-to-multipoint video connection from a subscriber in Los Angeles 200 to Washington DC 205 and New York 210. The video is sourced from an analog video from a video tape recorder 221 and received on the subscriber's private ingress line 228. The signal 280 is switched by the analog/digital switch 232 into the first available MPEG-2 encoder 236. The signal continues on into the mux 238 where it is given an ATM address that permits it to be properly routed by the ATM switch 240 and network 215. At the receiving POP, Washington DC 205, the demux 252 demultiplexes the aggregate OC-3 signal received from the ATM switch 250 and routes the demultiplexed MPEG-2 transport stream 285 into its dedicated MPEG-2 decoder 254. The baseband video output of the MPEG-2 decoder is passed to the analog/digital switch 256 which switches the signal into the customer's private egress line 262 for viewing on a video monitor 270. The New York POP 210 likewise receives the signal 287 and routes it to the subscriber via the subscriber's egress line 288. Immediately after establishing a connection, but prior to switching the subscribers ingress/egress lines 228 262 288 into the connection path 280 285 287, a brief test is conducted to test the quality of the connection.

Figure 3:
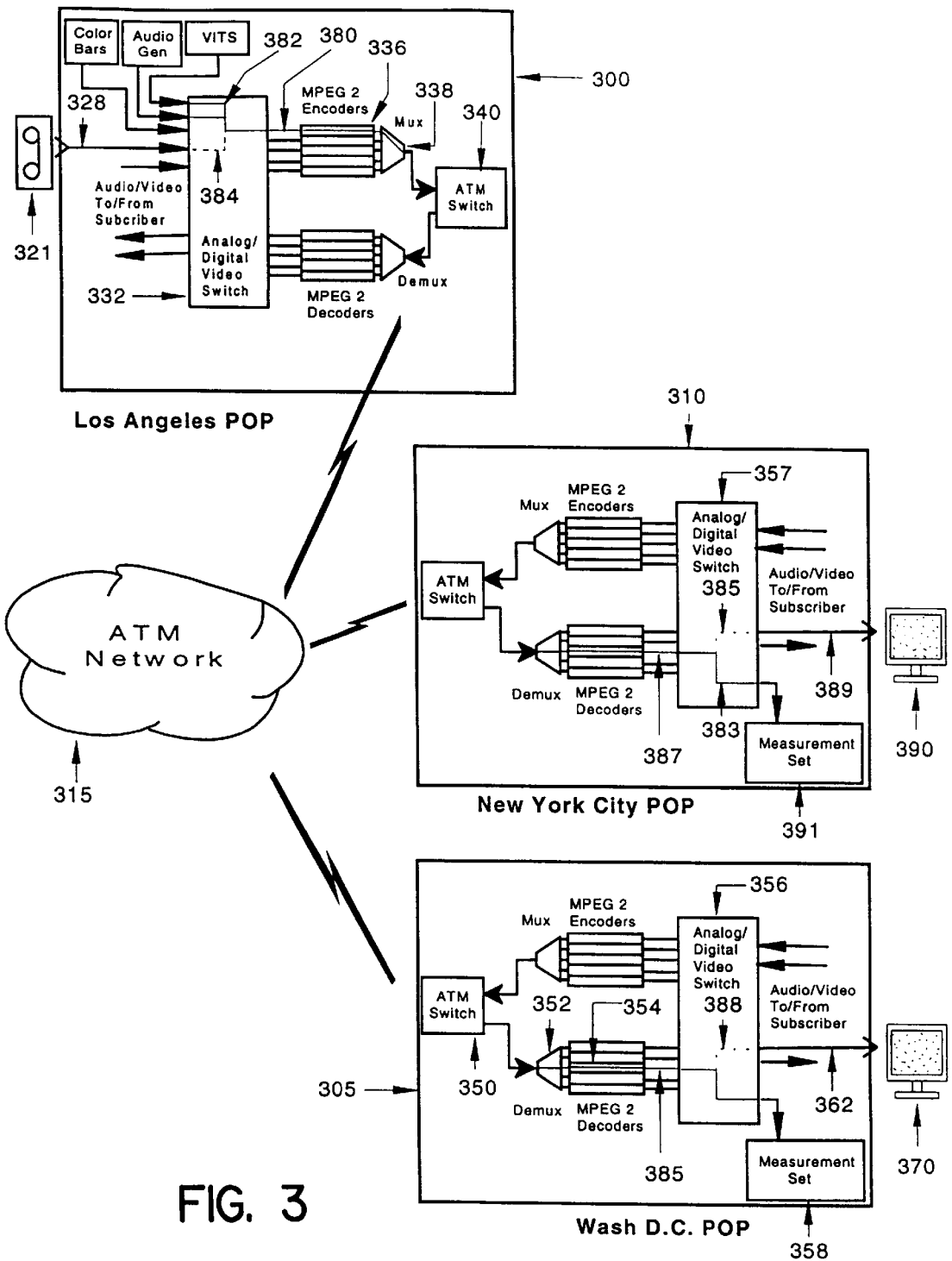
FIG. 3 is an illustration of an out-of-service test performed on a point-to-point video circuit employing video and audio test equipment.

In FIG. 3, the VITS test equipment is switched 382 into the connection to send a NTSC color bar test pattern to the distant end. At the receiving ends of the multipoint connection 305 310, the analog/digital switches 356 357 switch 388 383 the outputs of the audio/video connections 385 387 into their respective audio/video test measurement sets 358 391 for measurement and analysis. After a test duration of a few seconds, the test equipment is switched out and subscriber access lines 328 362 389 are switched 384 386 385 into the active connection and the circuit is turned over to the subscriber. If the color bar test had failed, a new video connection would have been established using an entirely different set of network resources. The new connection would then be tested prior to release to the subscriber.

Figure 4:
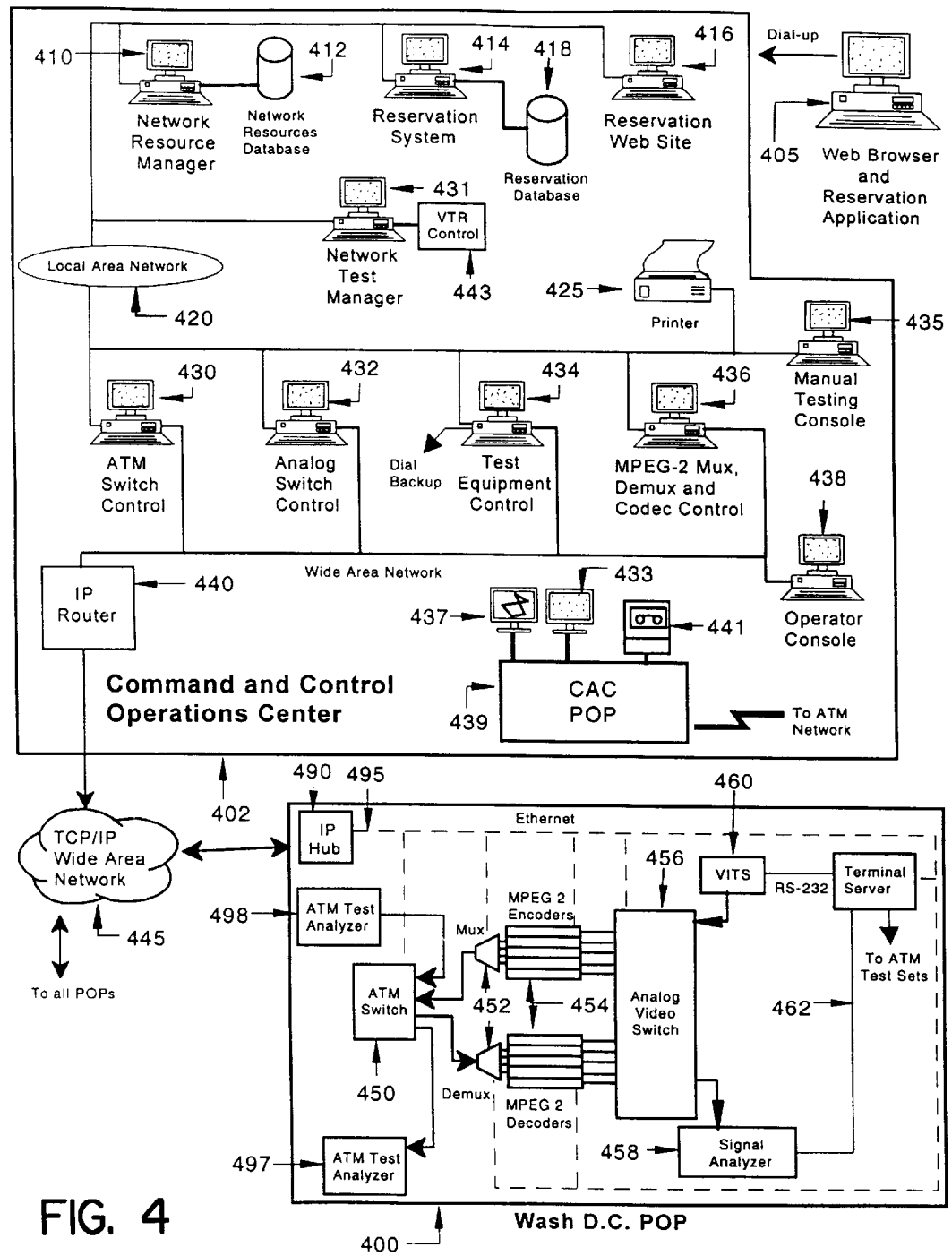
FIG. 4 is a detailed diagram of the CAC center in FIG. 1.

FIG. 4 illustrates in detail the components of the Command and Control (CAC) Operations Center 402. The CAC maintains a database 418 of each subscriber reservation. A subscriber makes reservations for video circuits from his/her computer 405 which is configured with a web browser. After connecting to the IVS reservation web server 416, the subscriber is presented with a web page that solicits reservation data. The reservation request is passed on to the reservation system 414 which then queries the network resource manager 410 to ensure there are adequate resources in the network to establish the circuit at the requested time. The network resource manager 410 in turn queries the network resource database 412 to check the availability of access lines, encoders, decoders, and network bandwidth. If needed resources will be available to honor the future connection, the network resource manager updates resource database and responds affirmatively to the reservation system 414 which then updates its reservation database 418. The reservation web server 416 informs the subscriber of the confirmed reservation by refreshing the reservation request web page.

FIG. 5 illustrates a reservation order web page 600 through which a subscriber reserves bandwidth for a future video transmission. The subscriber enters the start date and time 605 and the end date and time 610 of the connection. Also specified are origin 615 and destination 620 ports (cities). Upon submission 640 of the reservation order the web page is updated with the computed duration 625 of the connection, a reservation status of Confirmed 630 and a unique reservation ID 650 with which to reference the reservation in future transactions.

Returning to FIG. 4, the network resource manager 410 creates new video connections at the requested time and destroy connections when the reservation expires in addition to accepting new reservations. The network resource manager issues commands to a set of control programs that control the ATM switches 430, analog/digital video switches 432, audio and video test sets 434 and MPEG-2 equipment 436. The control programs, in turn, issue hardware specific commands to the slave equipment over a wide area network 445 that is accessed through an IP router 440. The commands are sent using Simple Network Management Protocol (SNMP) which is a well-known IP protocol used to control network hardware. Alternatively, the test equipment controller 434 can control the POP test equipment over dial backup line. Each controller runs in a separate computer with a user interface that permits network operators to take manual control of the POP equipment if operator intervention is deemed necessary, however control of the entire IVS network is fully automated under the control of the network resource manager 410. As each controller issues commands and detects POP alarms conditions, network status is updated at the operator's console 438 and printer 425 which are continuously monitored by the network operators.

The network test manager 431 is the platform on which the video feed monitor (VFM), in-service (IS) and out-of-service (OOS) test executives reside. All network testing is automated and controlled from this workstation 431. The manual test console 435 facilitates the manual testing of network resources for in-depth troubleshooting and ad-hoc problem isolation. The CAC POP 439 enables the video feed monitor (VFM) to route active video feeds to a bank of video 433 and waveform monitor/vectorscopes 437 for quality assurance. A video tape recorder 441 optionally records the snapshot of each feed under control of the VFM in network test manager 443.

Each POP is configured with an IP hub 490 that is the gateway to the wide area network. From the hub, Ethernet lines 495 are connected to each set of networking equipment and the terminal server 462. The terminal server permits the test equipment controller 434 to remotely control and monitor all test signal generators and measurement sets via an RS-232 control interface from a wide area IP network.

Figure 6:
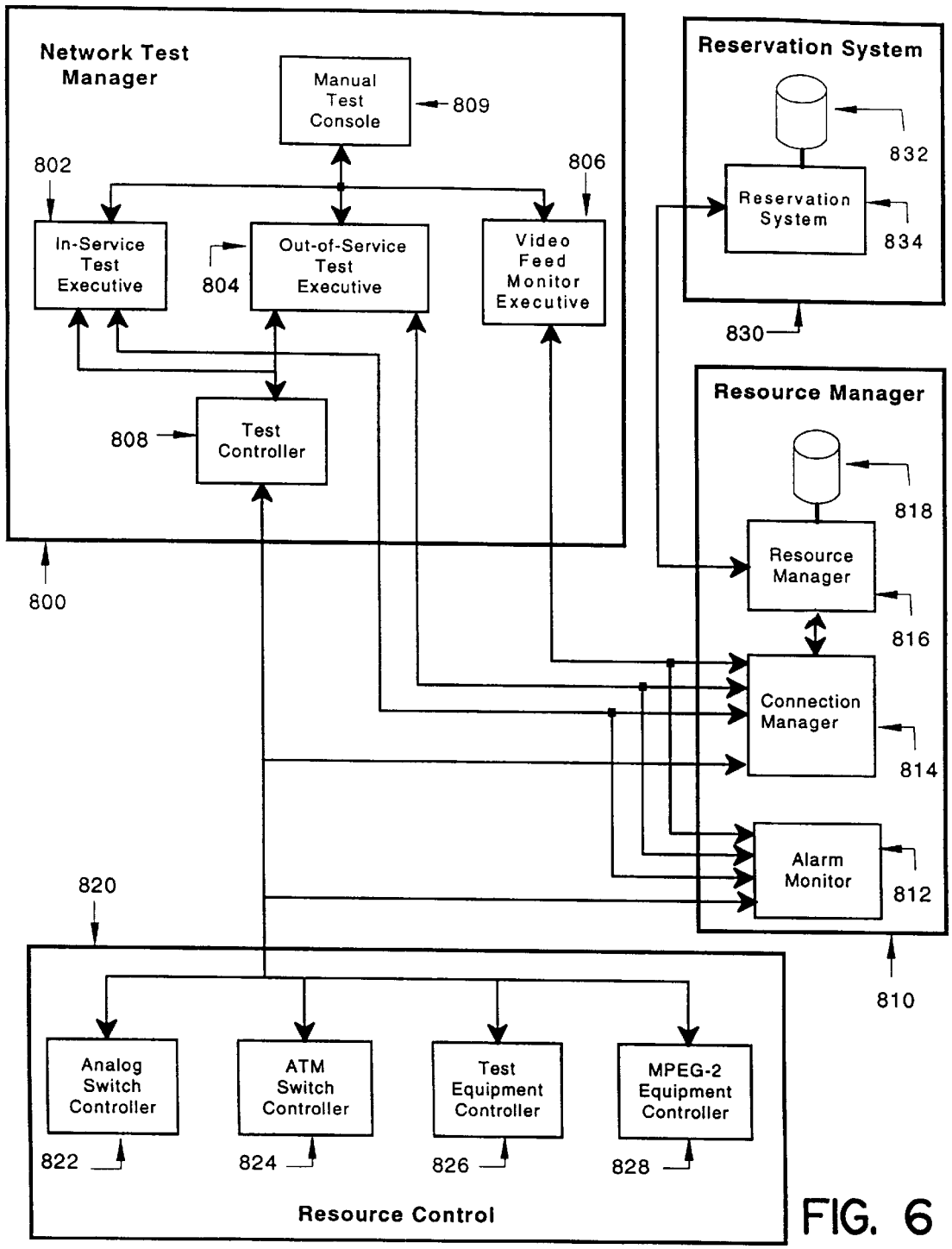
FIG. 6 is a diagram a network test manager and software test executive/network software components that execute in the CAC of FIG. 1.

In FIG. 6, the network test manager 431 is further illustrated. Three (3) executives: in-service test 802, out-of-service test 804 and the video feed monitor 806 run continuously controlling all aspects of network testing and monitoring. Each of the executives is manually controllable via a manual test console 809. A test controller 808 serializes access to the network resources which are directly controlled by a analog/digital switch 822, ATM switch 824, test equipment 826 and MPEG-2 equipment 828 controllers. A video feed monitor (VFM) 806 routes active video feeds into the CAC in a round robin fashion through requests to the connection manager 814. The VFM also responds to alarm conditions reported by an alarm monitor 812 which fields all alarms reported from the POPs. The VFM immediately switches to feeds that are directly affected by the hardware signaling the alarms. A connection manager 814 interfaces with an Out-Of-Service (OOS) test executive 804 to have new connections tested before being released to the subscriber. All connections are established by the connection manager 814 at the reservation start time by a resource manager 816 which maintains a database 818 of all resources to be used to establish all future video connections. A reservation manager 834 ensures resources are available before confirming the reservation.

The preferred embodiment of the present invention is incorporated in a communications network using real-time MPEG-2 video and audio compression. MPEG-2 is described in detail in the Moving Pictures Expert's Group (MPEG) standard, Coding of Moving Pictures and Associated Audio ITU Recommendation H.262 which is incorporated herein by reference. However as the details of MPEG-2 encoding/decoding are not essential to the understanding of the invention and are generally well understood in the art no description will be offered here.

Figure 7A:
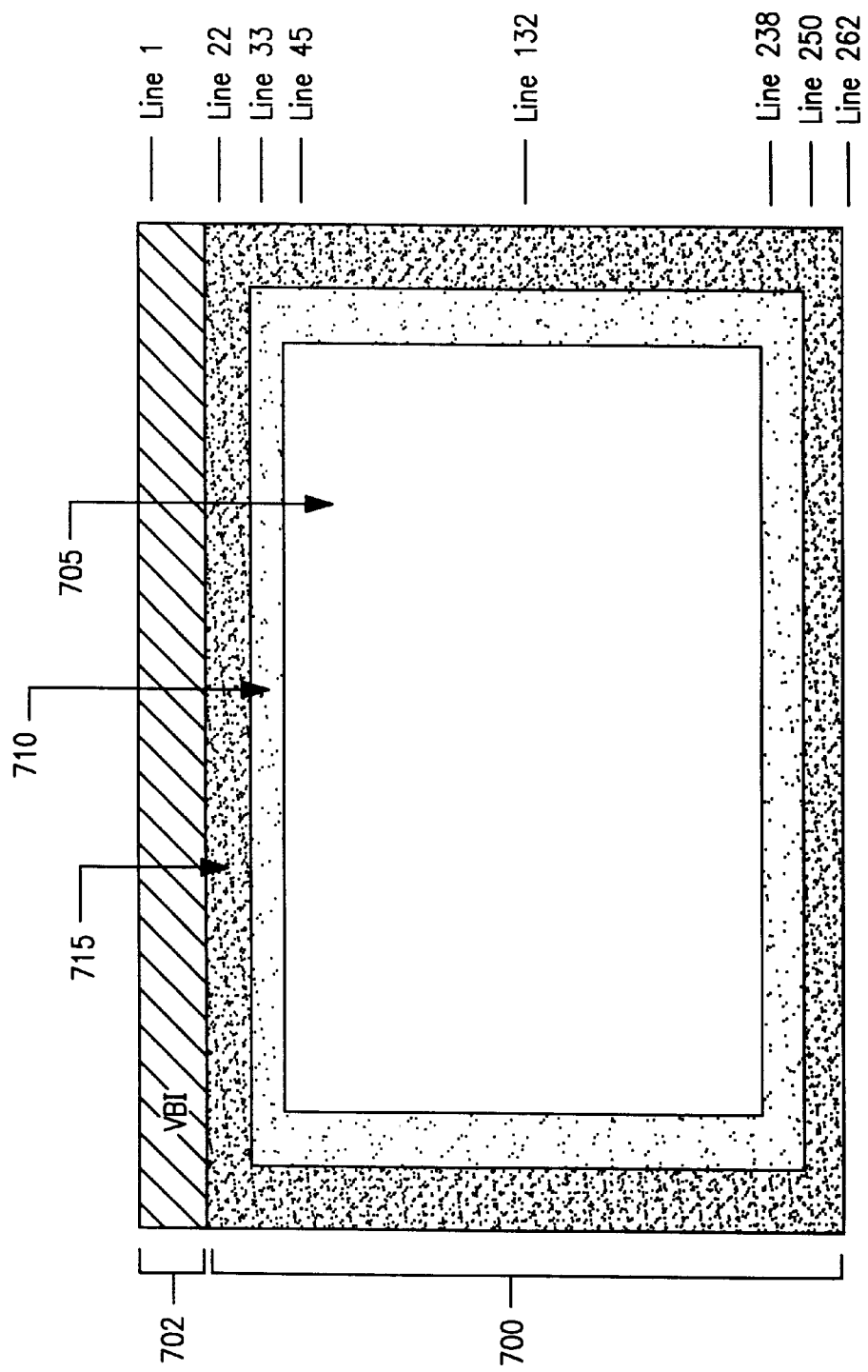
FIG. 7 is an illustration of representative television test signals.

In FIG. 7A, an active video area 700 of an NTSC broadcast of 525 video lines comprises 2 interlaced fields of 262.5 lines each (not shown). A vertical blanking interval 702 area is made up of video lines 1 through 21. Line 22 is the start of the active video area and it continues to video line 262. Lines 22 through 33 and lines 250 through 262 of each field lay in an overscanned area 715. The size of the overscan will vary for each television and even within the same television due to fluctuations in the voltage regulation of the power supply. To prevent viewers from seeing the non-picture areas of the horizontal and vertical scans, the overscan is typically set for 5% of the active video which effectively renders unviewable approximately 12 lines of each field at the top and bottom of the screen. The active video fuher comprises an action safe 710 and title safe 705 areas. These areas serve as boundaries that guide producers in the framing of a scene or placement of title text.

Figure 7B:
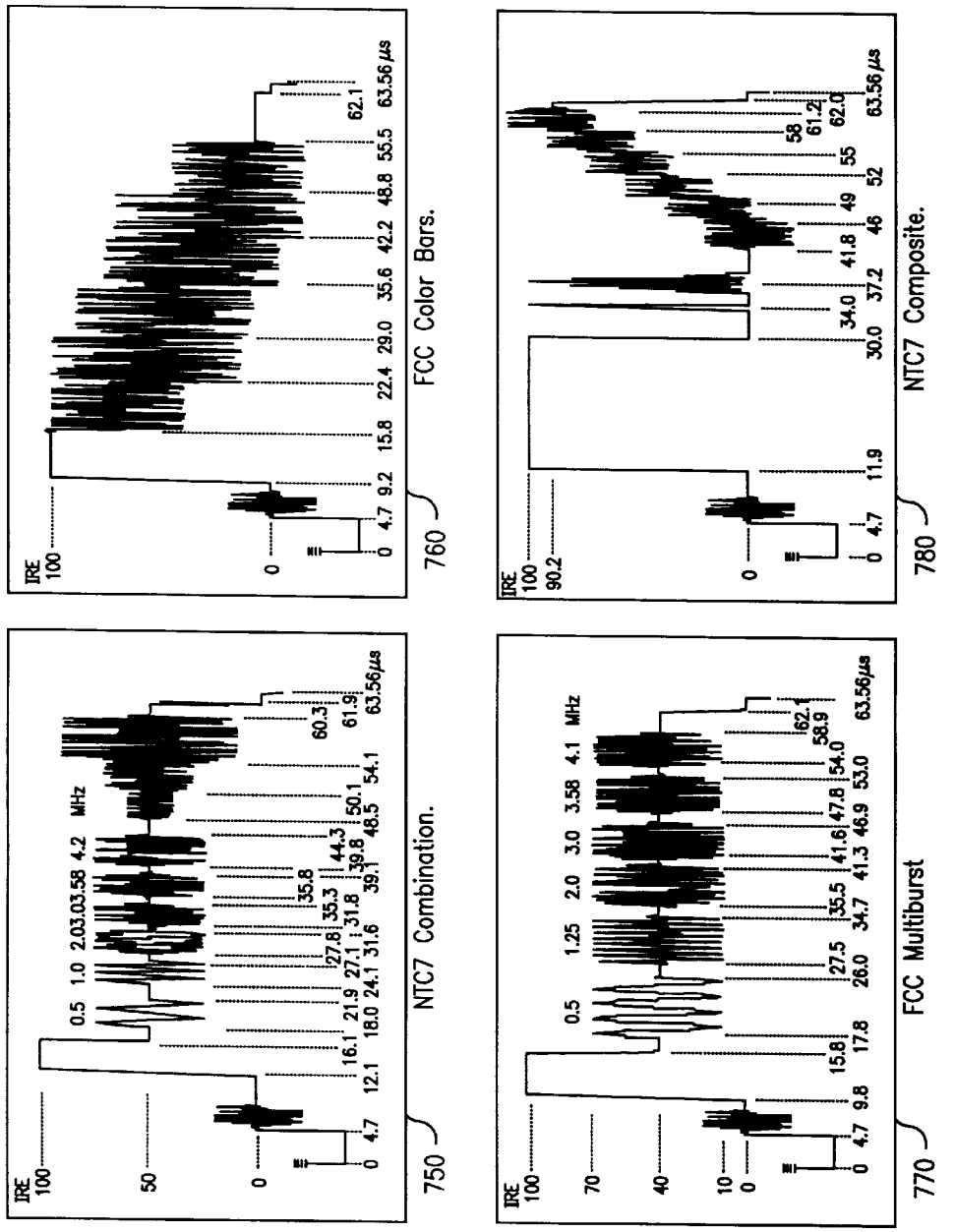

FIG. 7B illustrates a few of the well-known television test signals used to test video performance and quality over transmission systems. Shown are NTC7 Combination 750 for frequency response and distortion testing, FCC color bars 760 for amplitude and timing measurements, FCC multiburst 770 for frequency response and NTC7 Composite 780 allowing amplitude and phase measurements. One or more of these signals may be placed into VBI lines 10 through 20 of either field for in-service testing. For OOS testing, these signals may be placed anywhere in the active video area.

Figure 8:
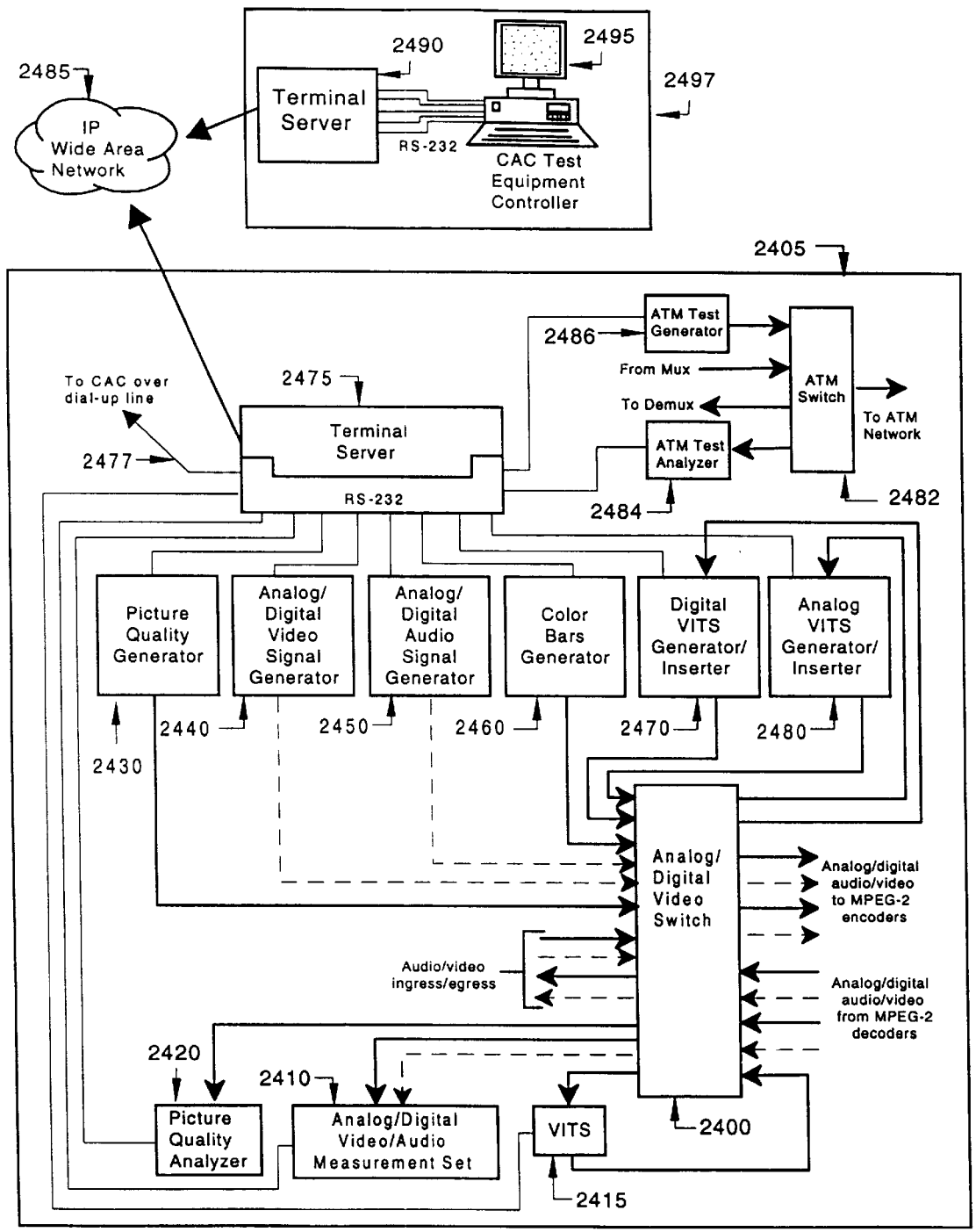
FIG. 8 is an illustration of a RS-232 control interface of the POP test equipment of FIG. 1.

In FIG. 8, the full complement of test equipment needed at each POP to test in both the analog and digital domains and the ATM network is illustrated. An analog 2480 and digital 2470 VITS insert test signals into the VBI for in-service testing. A picture quality generator 2430 and analyzer 2420 are long term tests, approximately 15 minutes each, that objectively measure picture quality in terms of Just Noticeable Differences (JND) scores. These tests are run off-line against newly installed hardware at encode rates ranging from 8 to 40 Mbps. Video 2440 and analog 2450 signal generators produce signals used in OOS testing as they are service affecting. All of the audio and video test signals are measured and analyzed by an analog/digital measurement set 2410. A downstream VITS 2415 is used during in-service testing to remove any test signals inserted by the upstream VITS 2470 2480.

ATM switch and network trunks are evaluated using an ATM test generator 2486 and analyzer 2484. The ATM specific test sets facilitate separate testing of the ATM network and provide problem isolation capabilities that cannot be achieved using television test signals. All test equipment is remotely controllable via well known RS-232 control interfaces. The command and control of the test equipment is accomplished under program control from a test equipment controller 2495 in the CAC. The RS-232 control signals are transmitted and received over an IP network 2485 via terminal servers 2475, 2490 which packetize and depacketize the RS-232 control information. The terminal server 2475 has a dial-up line 2477 which allows the CAC 2497 to control the test equipment during a Wide Area Network (WAN) IP network outage.

Under program control, several tests may be run concurrently by programming the VITS to insert simultaneously multiple test signals into VBI lines 10 through 20. A measurement set 2410 is pre-instructed to test each pattern at its assigned line and the results of all the tests are read out in a single operation. The test signals are inserted for less than a second.

In-Service Software Test Executive

In-service testing measures the analog video performance of active feeds by running EIA/TIA 250 C tests. EIA/TIA 250 C is the National Association of Broadcasters' (NAB) test specification of choice. Digital video is tested in accordance with ITU-R601 General Digital Video. In order to perform in-service testing without adversely affecting the broadcast, test signals are injected into the VBI at lines 10 through 20 inclusive. Since signals in the VBI are filtered out prior to MPEG-2 encoding, the present invention relies heavily on the techniques for in-service testing taught in the co-pending application entitled 'METHOD AND APPARATUS OF IN-SERVICE TESTING OF A COMPRESSED DIGITAL BROADCAST VIDEO NETWORK', supra which moves test signals from the VBI into the active viewing area. The test signals are removed from the active video area at the decoder and the lines used to carry the test signals are concealed from the viewer. Also relied upon is co-pending application entitled 'SYSTEM AND METHOD OF IN-SERVICE AUDIO/VIDEO SYNCHRONIZATION TESTING', supra, which teaches a transparent, non-service affecting method of audio/video synchronization. The test has traditionally used a very objectionable audio tone to test audio synchronousness.

Analog in-service testing is accomplished using such signals such as NTC7 Composite 730 which enables many tests from the EIA/TIA 250 C test suite to be run including:

Line time distortion

Chroma burst amplitude

Audio/video synchronization

Y/C gain delay

Luminance non-linearity

Differential gain

Differential phase

The foregoing seven (7) tests provide an excellent indication of video quality. Two additional signals, FCC Multiburst 720 for frequency response testing and NTC7 Combination 710 for chroma non-linearity enable a further and more complete analysis of video performance. All of the above tests can be run in sub-second time which allows each active connection to be tested more frequently. Digital video tests include jitter, signal amplitude and legal color palette.

Such analog and digital tests are well-known to those skilled in the art of broadcast television testing and no further discussion of these tests is deemed necessary as the teachings of the present invention do not involve the test procedures or results analysis.

Figure 9:
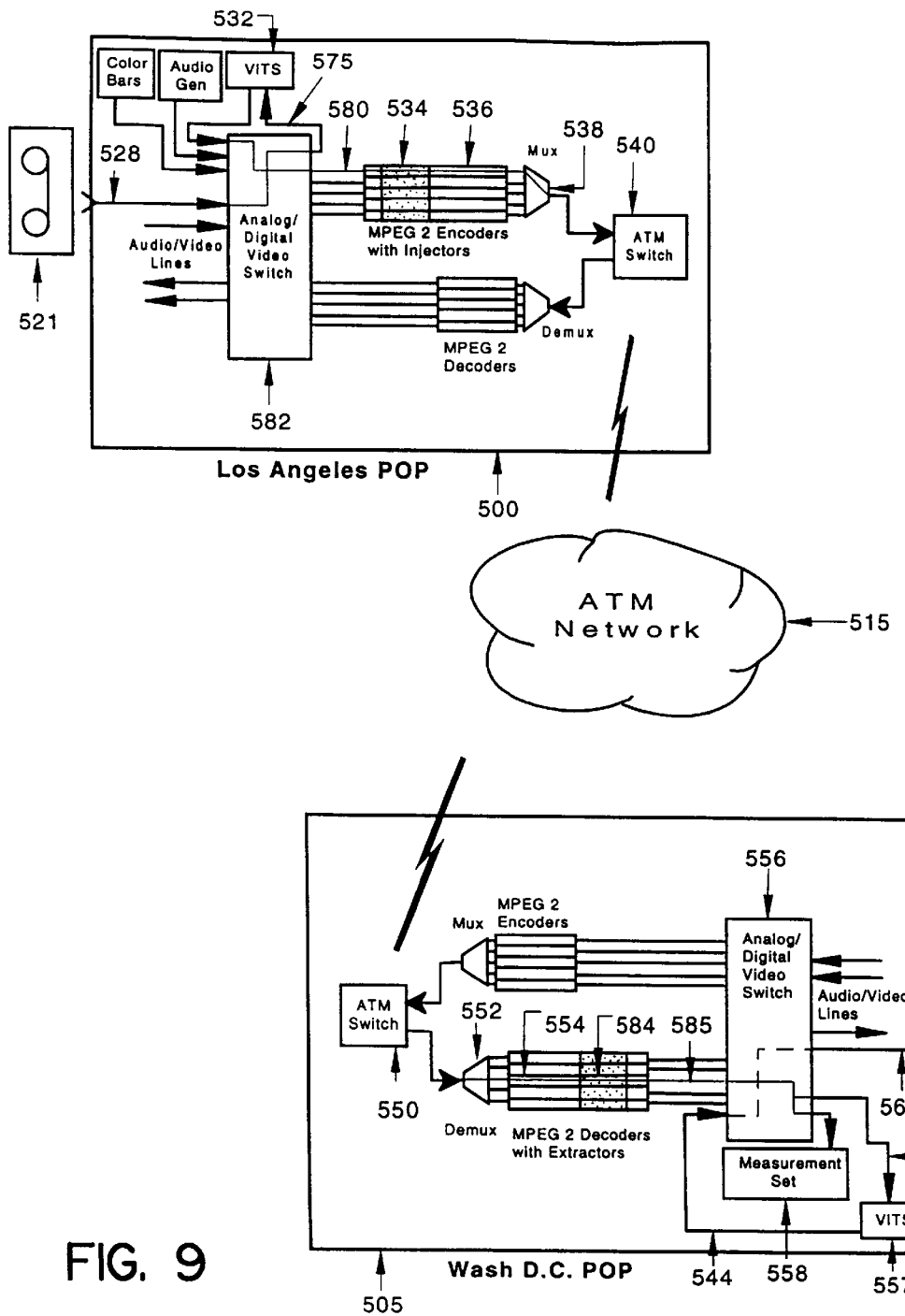
FIG. 9 is an illustration of an in-of-service video quality test performed by a POP using the system of FIG. 1.
Figure 10:
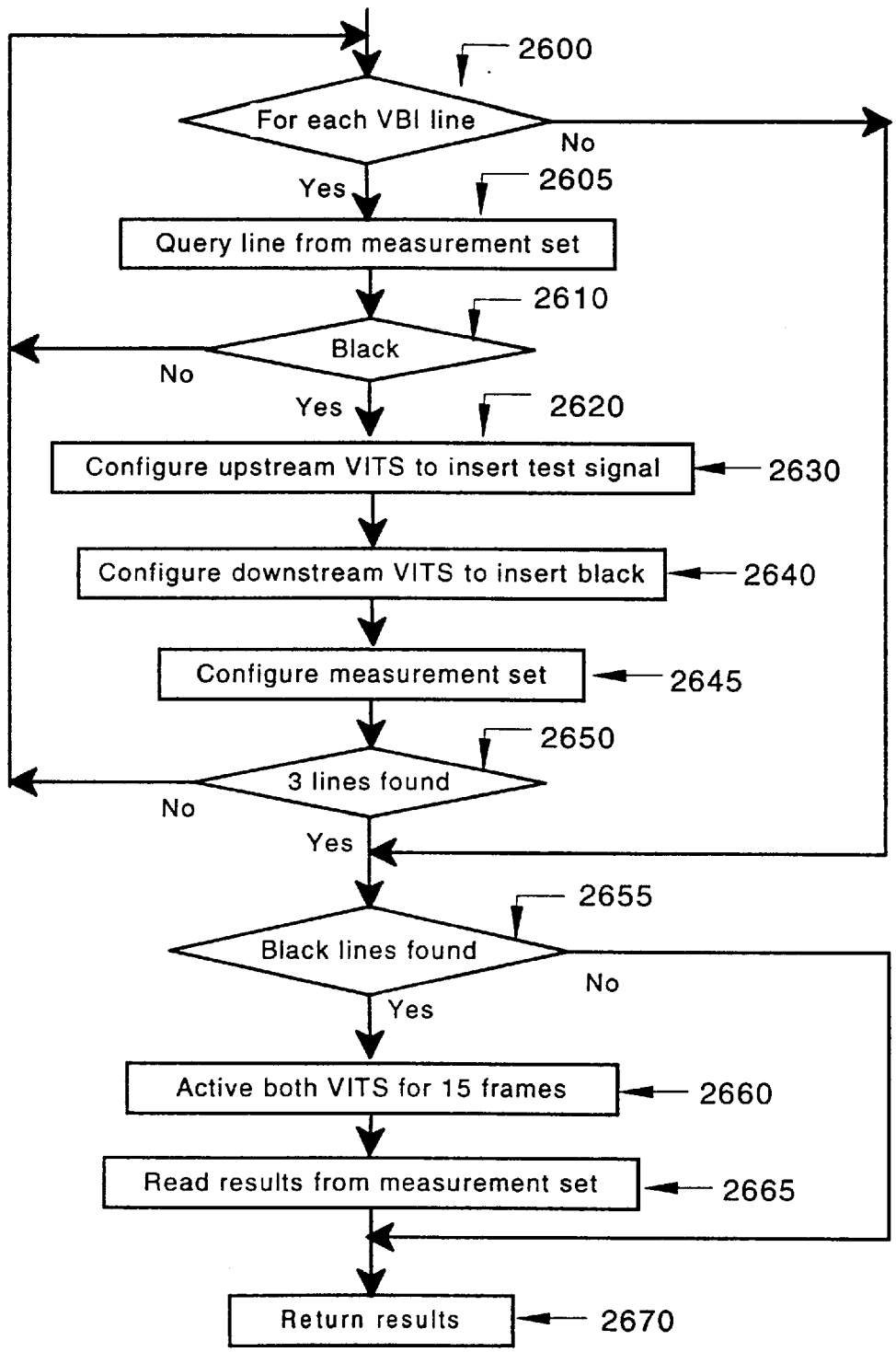
FIG. 10 is a logic flow diagram for running the in-service test of FIG. 9.

FIGS. 9 and 10 illustrate in-service testing at a POP and the logic flow of VBI in such testing. The VBI of the video signal received from the subscriber may contain signals inserted by the subscriber so an unused or black VBI must be chosen for in-service testing in order not to interfere with the subscriber's VBI data. An idle VBI line is found by searching VBI lines 10 through 20 in block 2600 using a measurement test set 558 to analyze the line in block 2605. When an idle line is found in block 2610, a VITS 532 on the transmit side is configured in block 2630 to insert the in-service test signal on that line, a downstream VITS 557 is configured in block 2635 to insert black on the same line, and the measurement set 558 is configured in block 2640 with the VBI line ID and the test signal type. After 3 unused VBI lines have been found in block 2650 or all of the VBI lines have been searched in block 2600, execution falls to block 2655 where a test is made to see if any black lines were found. If not, the routine in block 2670 returns without conducting the test. Otherwise, both VITS are activated to insert the test signal and black concealment line for a period of 15 frames in block 2660.

In-service tests are initiated by:

1. Periodic testing of active feeds.

2. Test requests generated from alarm activity.

3. Test requests from the manual test console.

FIG. 9 illustrates in-service-tests from an origin POP 500 to a receiving POP 505. A subscriber's video feed 528 is routed through a analog/digital video switch 582 into the vertical interval test signal (VITS) equipment 532 which inserts a test signal into the chosen VBI line without affecting the active video. The analog/digital switch then routes the output of the VITS into an MPEG-2 encoder 536 for encoding and transmission. An injector 534 moves the test signal from the VBI into the active video area before the video is encoded. At the receive end 505, an extractor 584 moves the test signal from the active area into the VBI and a decoded signal 585 is routed into two output ports by an analog/digital switch 556. One port is connected to a VITS 557 and the other to a measurement set 558 that performs analysis and measurement of the video test signals in block 2665 (See FIG. 10). The VITS 557 receives the video signal 546 and inserts black into the line that contains the in-service test signal, effectively removing the test signal from the broadcast. The video is then routed back into a analog/digital switch 556 where is it switched into the subscriber's egress line 562. In this manner, the IVS network is tested end-to-end affecting neither the viewed broadcast nor the subscriber's VBI signals or data.

Figure 11:
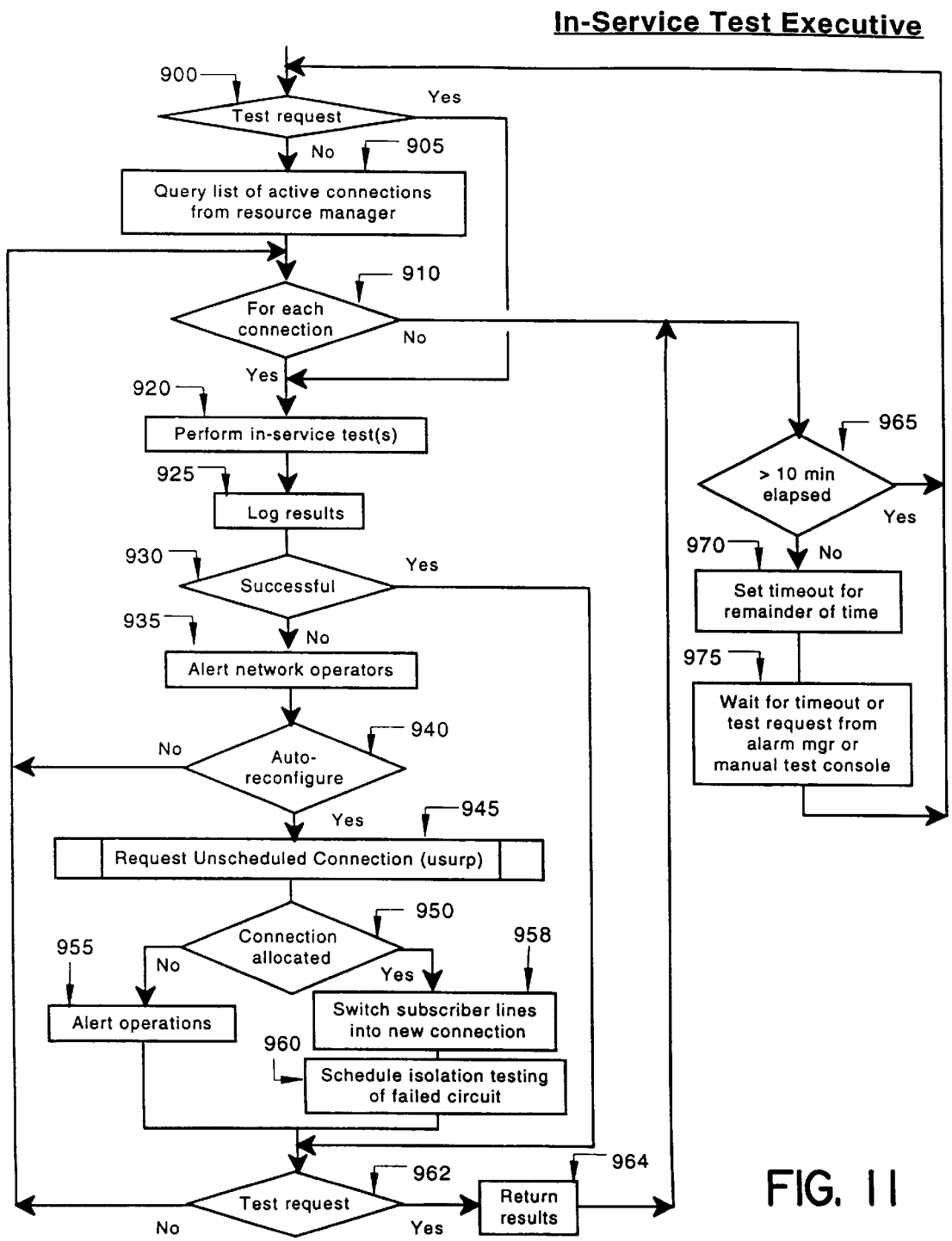
FIG. 11 is a logic flow diagram of an in-service software test executive in the system of FIG. 1.

In FIG. 11, the logic flow diagram of the in-service (IS) test executive 802 (See FIG. 6) will be described in conjunction with FIG. 11. The IS test executive runs continuously testing active video feeds and responding to test requests from an alarm monitor 812 at a manual test console 809. At each invocation, a test is performed in block 900 to determine the cause of invocation. The test(s) is run against specified hardware in block 920, otherwise the executive is run due to the expiration of the timer (not shown) that initiates IS testing of the active feeds. A list of all active connections is queried in block 905 and a loop is entered where for each active and untested connection identified in block 910, IS testing is performed in block 920 and the results are logged in block 925. The results of the IS tests are queried in block 930 and if successful and the completed test was a periodic IS test identified in block 962, the loop iterates to the next video feed. Otherwise the results are returned in block 964 to the caller, either the alarm monitor or manual test console. The elapsed time is checked in block 965 to determine whether it is time for periodic IS testing to start again. If so, the main loop is reentered. If not, a timer is set for the remaining time in block 970 and the IS executive enters a wait state in block 975 that will be satisfied by either the expiration of the timer or a request to run IS tests.

A test failure causes the executive to alert the network operators in block 935 via an audible alarm and operator's console message and a test is made to see whether the failing circuit should be automatically reconfigured in block 940. If auto-reconfiguration has been disabled, the loop iterates. Else a new, unscheduled connection is requested of the resource manager in block 945 (to be described in FIG. 12). If the resource manager is able to establish a new connection in block 950, the subscriber ingress/egress lines are switched into it in block 958. If the new connection was not provisioned in block 950, the network operator is given a second and higher priority alert message in block 955 to handle the circuit outage. The failed circuit is then scheduled for isolation by the out-of-service test executive in block 960. The problematic circuit is left in a connected state to because the resources cannot be released until the failed component has been identified. If the IS test executive was not processing a test request in block 962, the loop iterates to the next connection.

Figure 12:
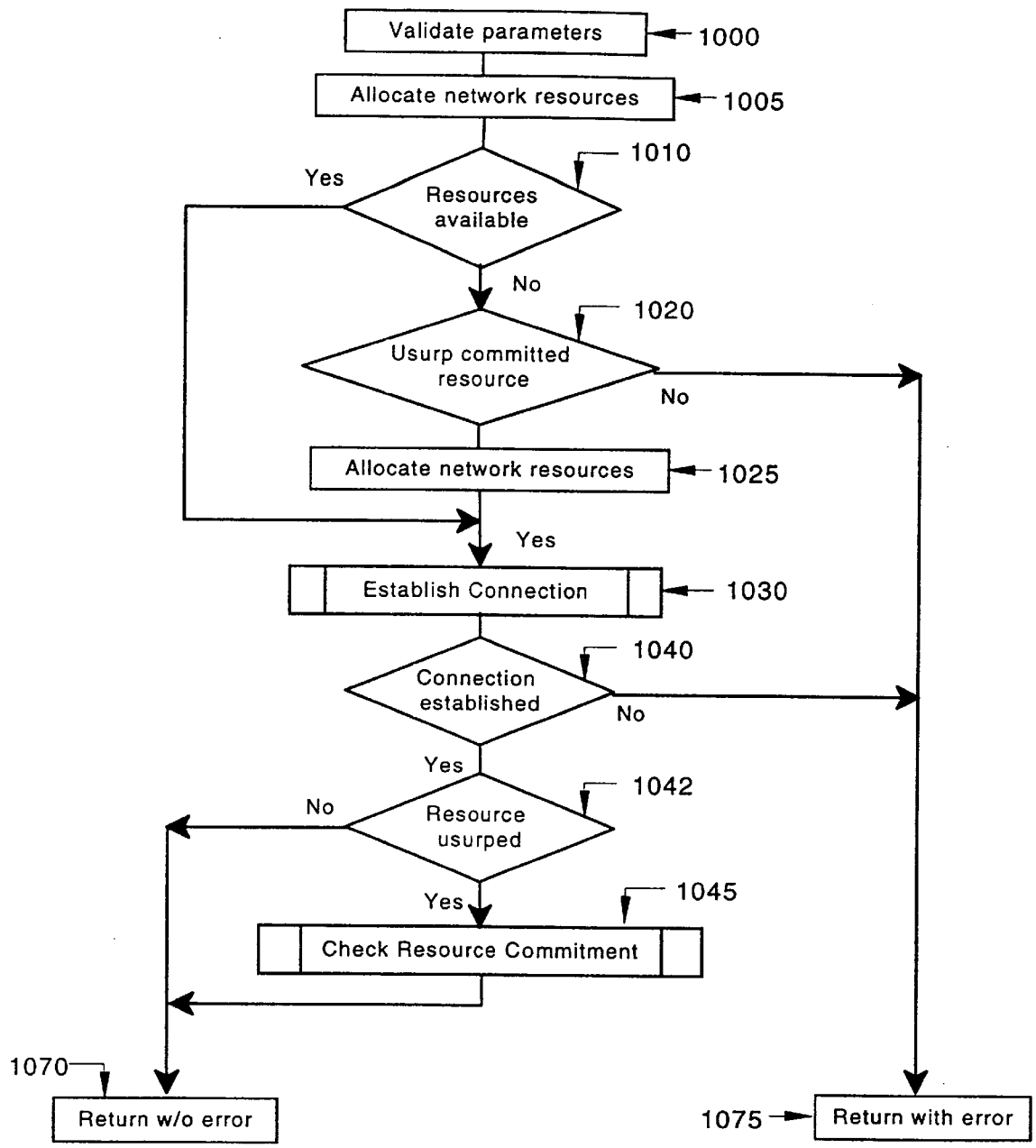
FIG. 12 is a logic flow diagram of an unscheduled connection request.

FIG. 12 illustrates a request to make an unscheduled connection. The connection parameters are validated in block 1000 and the resources are requested of the resource manager 810 (See FIG. 6) in block 1005. If the resources are not available 1010, a check is made to see if the calling routine specified usurpation in block 1020. Generally, committed resources are only usurped to restore a failed video feed. If the resources were not allocated, the connection is denied and the routine returns with error in block 1075. Else, the resource is taken from a future reservation in block 1025 and the connection is established in block 1040. If the connection is successful in block 1040 and a resource was usurped to provision it in block 1042, a Check Resources Commitments is called in block 1045 to mark any affected reservations as 'non-viable'. The routine then returns without error in block 1070.

Figure 13:
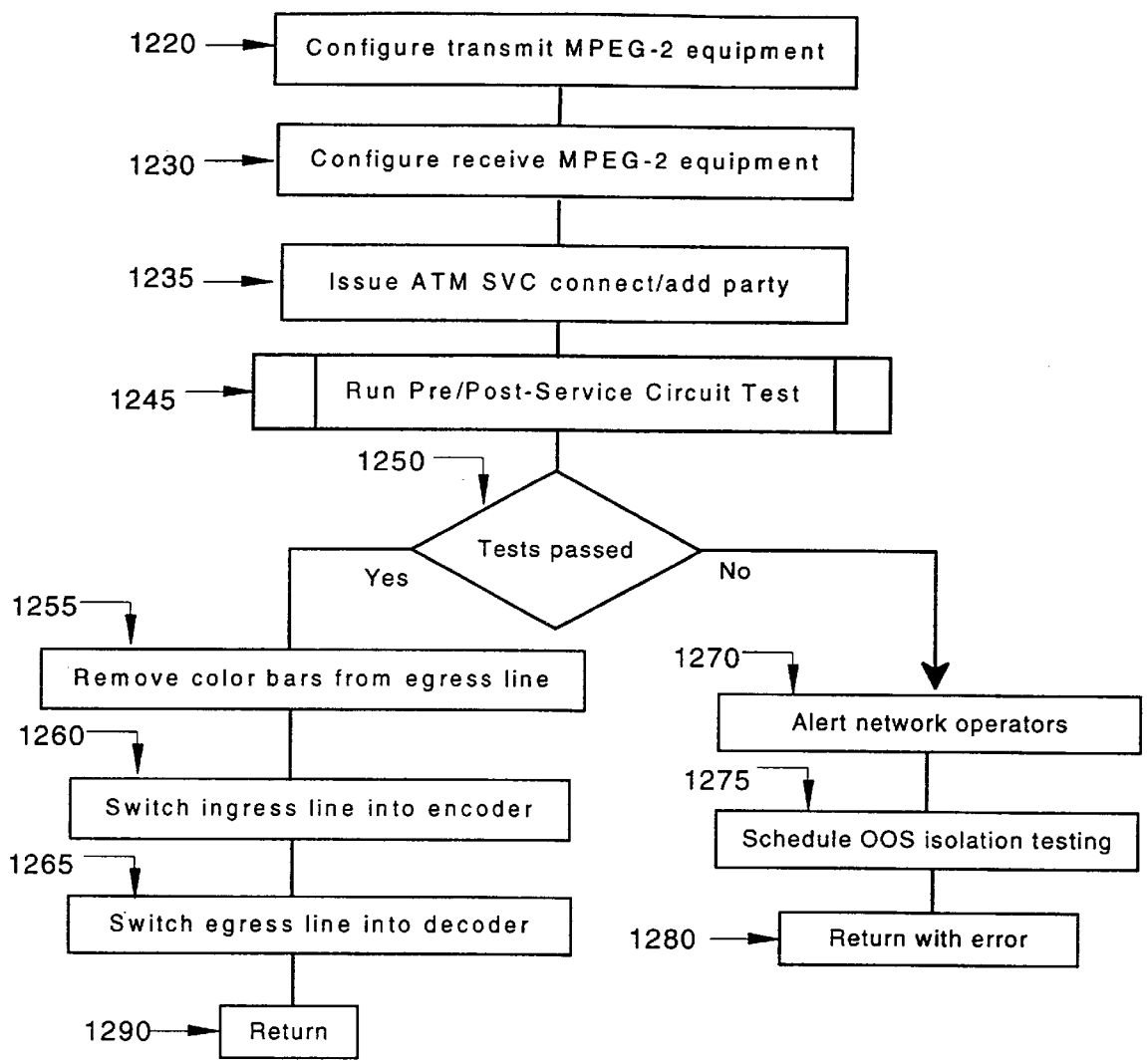
FIG. 13 is a logic flow diagram for establishing a connection.

In FIG. 13, an Establish Connection routine is run by the connection manager 814 (See FIG. 6) which is part of the resource manager 810. Establishing a connection involves configuring the transmit and receive MPEG-2 components in blocks 1220 and 1230 and issuing the ATM connect and add party commands in block 1235 to setup a switched virtual circuit to the destination POP(s). A set of OOS pre/post-service video and audio tests is then run in block 1245 by the OOS test executive 804 (See FIG. 6). If the tests are successful in block 1250, a color bars test pattern is removed from the subscriber's egress line in block 1255. The ingress and egress lines are switched in blocks 1260 and 1265, respectively into the connection giving the subscriber end-to-end connectivity and the routine returns a successful result in block 1290. If the tests fail in block 1250, the CAC operators are alerted in block 1270 and OOS isolation testing is scheduled in block 1275 to troubleshoot the failed connection. Thereafter, the routine returns an error code to the caller in block 1280.

Out-Of-Service Software Test Executive

Now turning to the OOS software test executive, all out-of-service diagnostic tests, problem isolation, acceptance testing and any probative procedure of a disruptive nature are automated and controlled by the executive. In contrast to IS testing, OOS testing permits a full range of audio testing and long duration video tests such as objective picture quality analysis. Invasive audio signals, long term video tests using the active video area and ATM testing differentiate OOS testing from in-service testing, in particular tests such as:

Audio unity gain
Audio signal/noise
Audio noise floor
Audio harmonic distortion
ATM jitter
ATM Cell loss
ATM trunk bit error rate
ATM signaling
Zone plates video test pattern The OOS test executive is divided into five (5) testing sub-components:

1. Idle resource
2. Problem isolation
3. Pre/post service
4. Manual console
5. Acceptance/maintenance Idle resource testing is timer driven and is invoked a minimum of 4 times a day. Isolation testing, which isolates faults to the component level, is scheduled by the connection manager 814 and the IS test executive 802 as circuit failures are detected shown in FIG. 6. Pre/post-service testing is a limited set of OOS tests that is run when a connection is established and broken.

Requests from the manual test console 809 are generated by ad-hoc operator testing or troubleshooting, which is commonly in response to subscriber complaints. Acceptance and maintenance testing are scheduled whenever new hardware resources are added to expand the network or faulty components are removed and replaced. Although installation is often accomplished during normal business hours, the testing is generally deferred to off-peak hours.

When scheduling acceptance and maintenance tests, automatic reconfiguration may be enabled which causes the new resource(s) to be automatically added to the network database and placed on-line.

Figure 14:
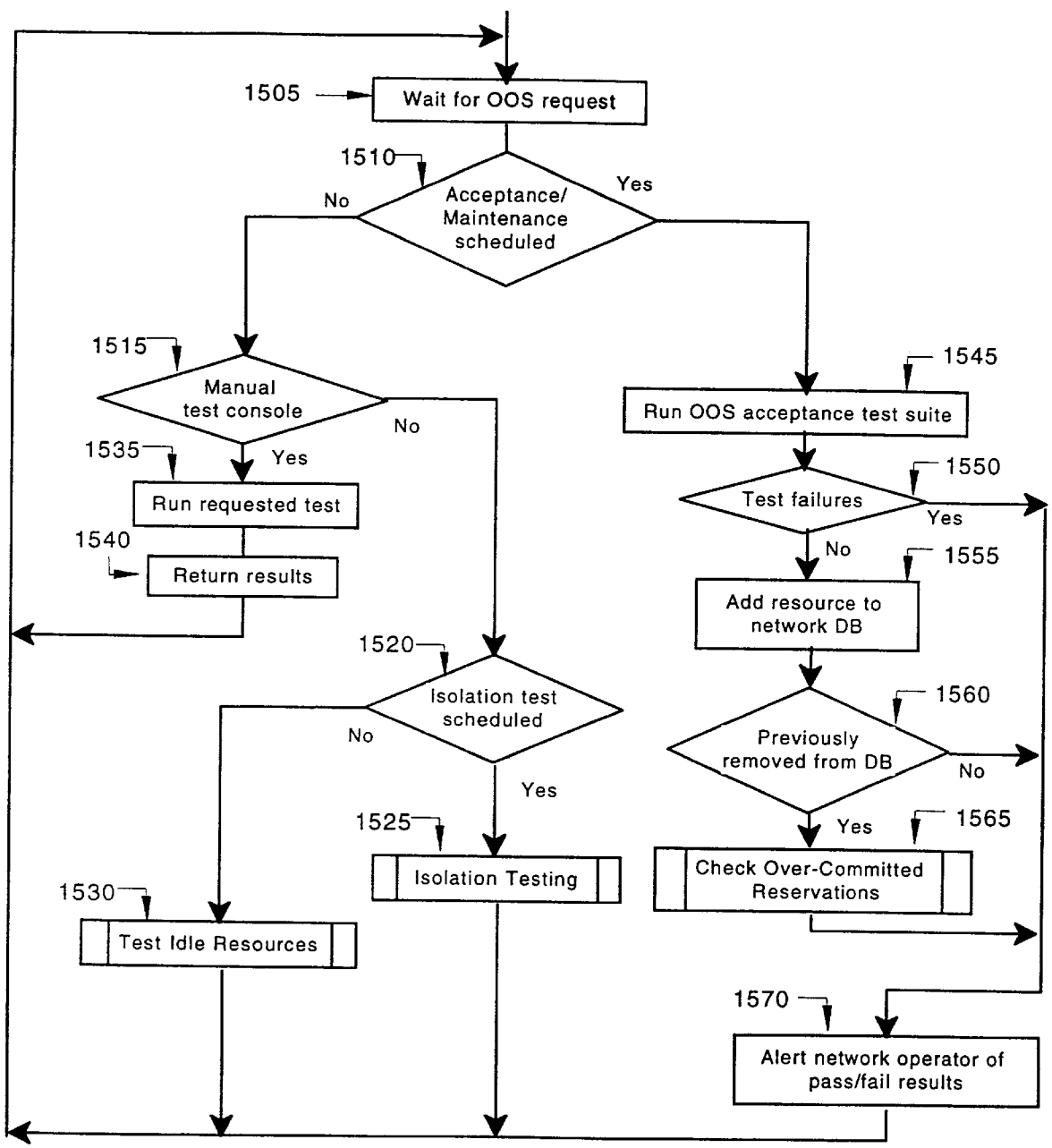
FIG. 14 is a logic flow diagram of an out-of-service software test executive.

FIG. 14 illustrates the high level logic flow of the OOS test executive shown in FIG. 6. The main processing loop of the executive enters a wait state in block 1505 until a test request is received. In block 1510, if the request is for testing subsequent to a new installation or a maintenance action in the field, the full OOS acceptance test suite is run to validate the new hardware in block 1545. Any failures that occur in block 1550 result in notification to the network operator in block 1570. If the hardware passes diagnostics, the resource is added to the network database in block 1555. If the resource had been previously removed from the database in block 1560, reservations are checked in block 1565 to see if any connections are scheduled to use the repaired resource. The lists of tests run and the results are logged to the operator console in block 1570. If the OOS test request is from the manual test console in block 1515, the requested tests are executed in block 1535 and the results are returned to the requester in block 1540. Continuing with the OOS test request processing, if problem isolation is scheduled in block 1520, the isolation routine is invoked in block 1525.

Figure 15:
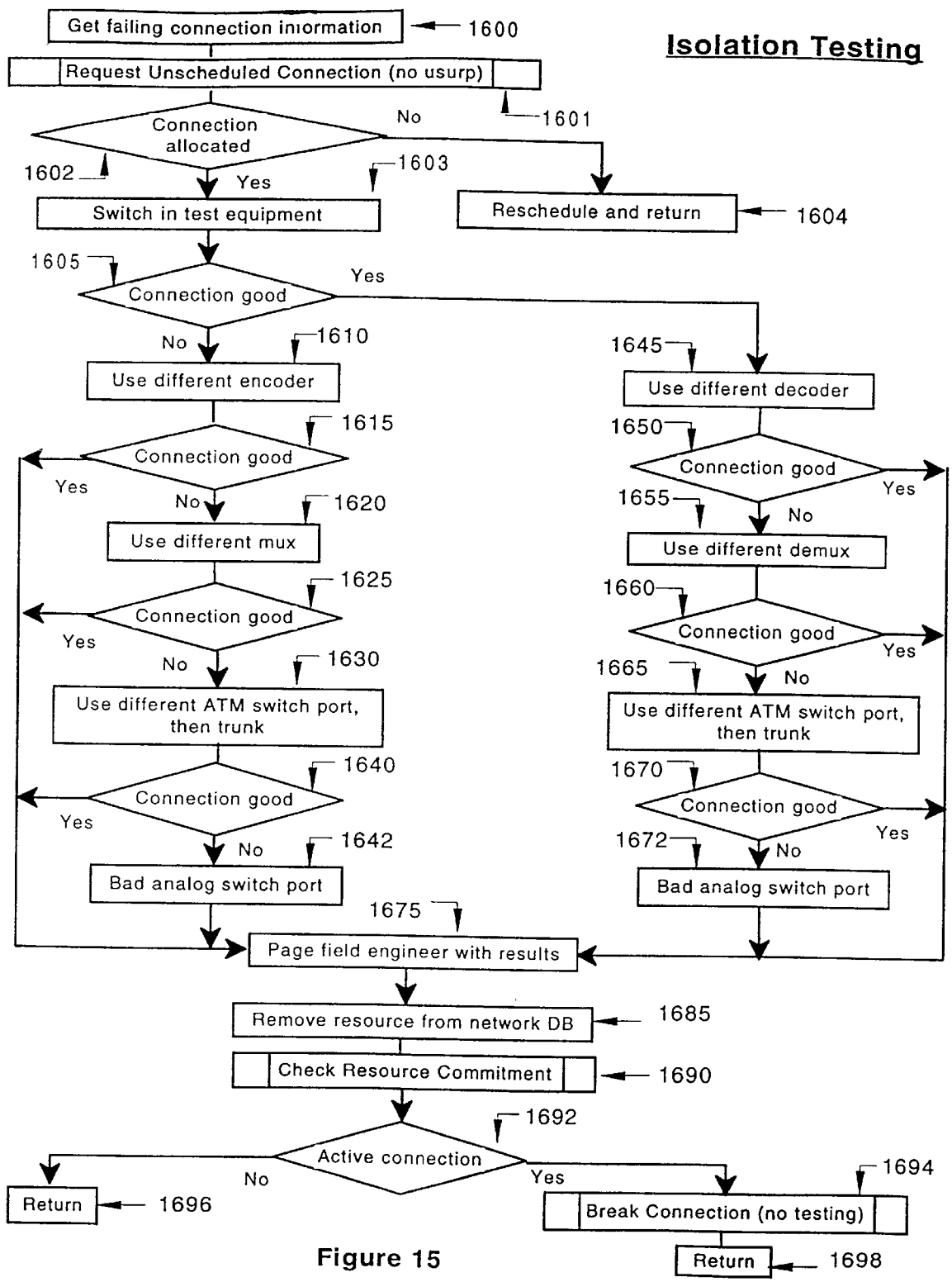
FIG. 15 is a logic flow diagram for isolation testing.

FIG. 15 illustrates the task of automatically isolating failed components anywhere in the network. The automation of this process eliminates the need for network engineers to issue numerous commands from multiple consoles to a set of heterogeneous components procured from multiple vendors. IVS Network operations are automated and the setup and removal of connections occur continuously and given that subscriber reservations are accepted for as soon as 15 seconds in the future, network engineers cannot know with certainty what resources can be safely used to aid in troubleshooting without jeopardizing network availability. Isolation commences by obtaining the ID of all the resources used in the failed connection information in block 1600 and requesting an unscheduled (multipoint) connection in block 1601. The connection adds a leaf to the faulty connection so that a third POP can participate in the troubleshooting in order to isolate the problem to either the transmit or receive chain. The third POP is almost always the CAC POP which has subscriber service. If the connection is denied due to lack of resources in block 1602, the isolation testing is rescheduled and the routine returns in block 1604 to block 1600. Otherwise, the test generator and test analyzers (See FIG. 9) are switched into the connection to test for continuity in block 1603. If the connection is restored in block 1605, the fault lies somewhere in the receive path and problem is further isolated by configuring in blocks 1645,1655, and 1665 a different decoder, demultiplexer and ATM switch port and trunk, respectively. If any of these changes restores the circuit, the field engineer is paged in block 1675 with the failure data, the failed resource is removed from the network database in block 1685 and a check is made in the Check Resource Commitment in block 1690 to see if any future reservations are contingent on this resource. If the connection is still active in block 1692, the multipoint connection is disconnected in block 1694, bypassing the post-service testing that is normally done prior to freeing the resources. In block 1698, the routine then returns to block 1600. If the multipoint circuit at the third POP received neither video or audio in block 1605, isolation proceeds at the transmitting POP. In blocks 1610, 1620 and 1630, the encoder, multiplexer, and ATM switch port and trunk, respectively are reconfigured in serial order. If the circuit still is not restored, the problem is isolated to the analog/digital switch port in block 1642.

Figure 16:
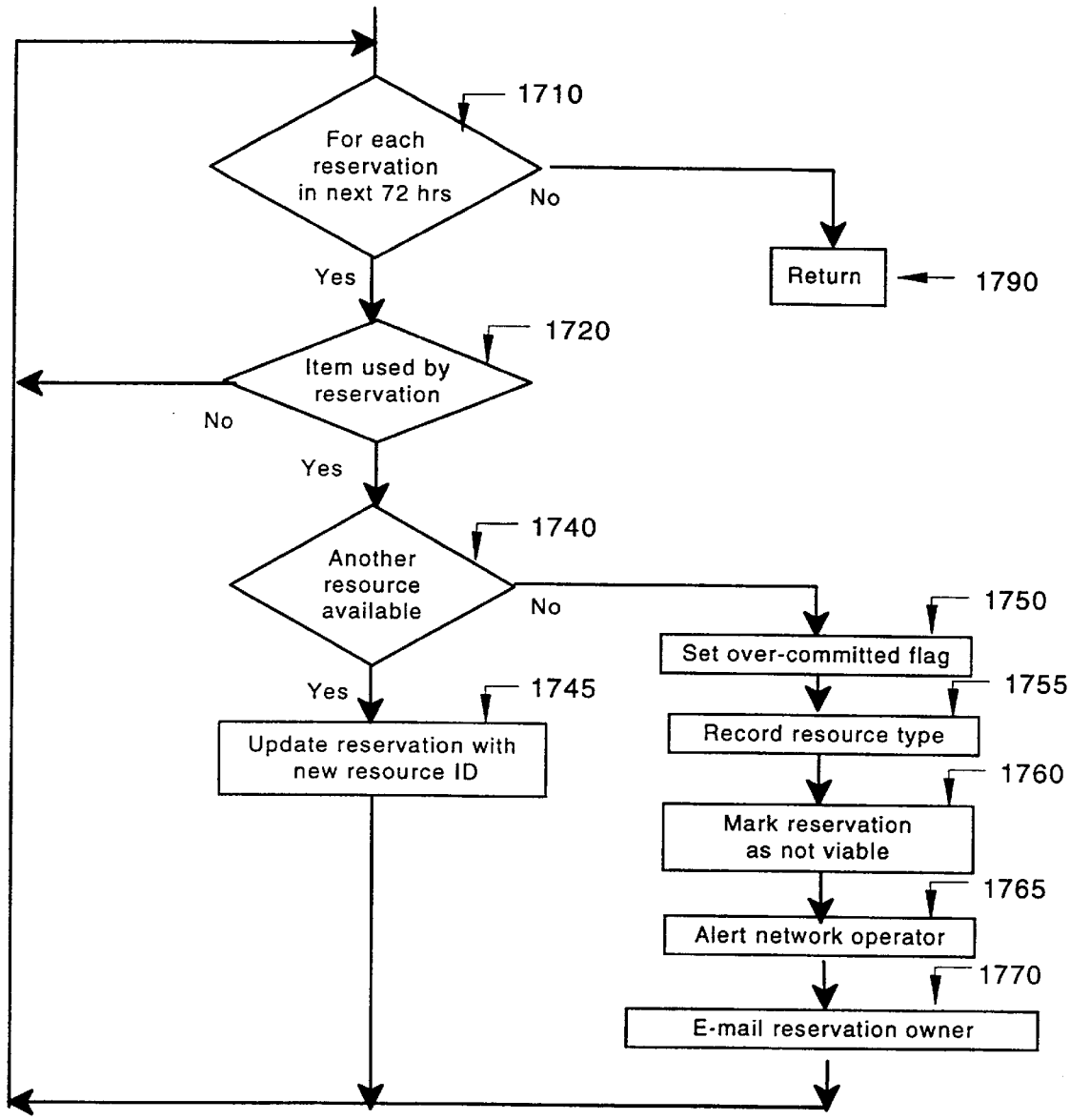
FIG. 16 is a logic flow diagram for checking resource commitments.

FIG. 16 illustrates a Check Resource Commitment (CRC) routine which is necessitated whenever network resources are unexpectedly allocated or removed from the network database due to failure. The invocation of the CRC ensures all subscriber reservations within the next 72 hours will be honored. The network mean time to repair is 24 hours. Reservations 72 hours in the future are processed in case an extended outage is experienced. All reservations for the next 72 hours are examined in block 1710 to see if the resource being removed from service had been committed to the connection in block 1720. If not, the loop iterates. Otherwise an attempt is made to replace the failed resource with another of the same type in block 1740. If another resource can be committed, the reservation is updated to reflect the ID of the replacement resource in block 1745. If no spares exist, the over-committed global flag is set in block 1750 and the reservation is updated with the type of resource needed in block 1755 and a status of 'non-viable' is indicated in block 1760. An alert is generated in block 1765. In block 1779 the reservation owner is e-mailed with the updated reservation information and an expected time of restoration. After all reservations have been checked in block 1710, the routine returns in block 1790 to the block 1710.

Figure 17:
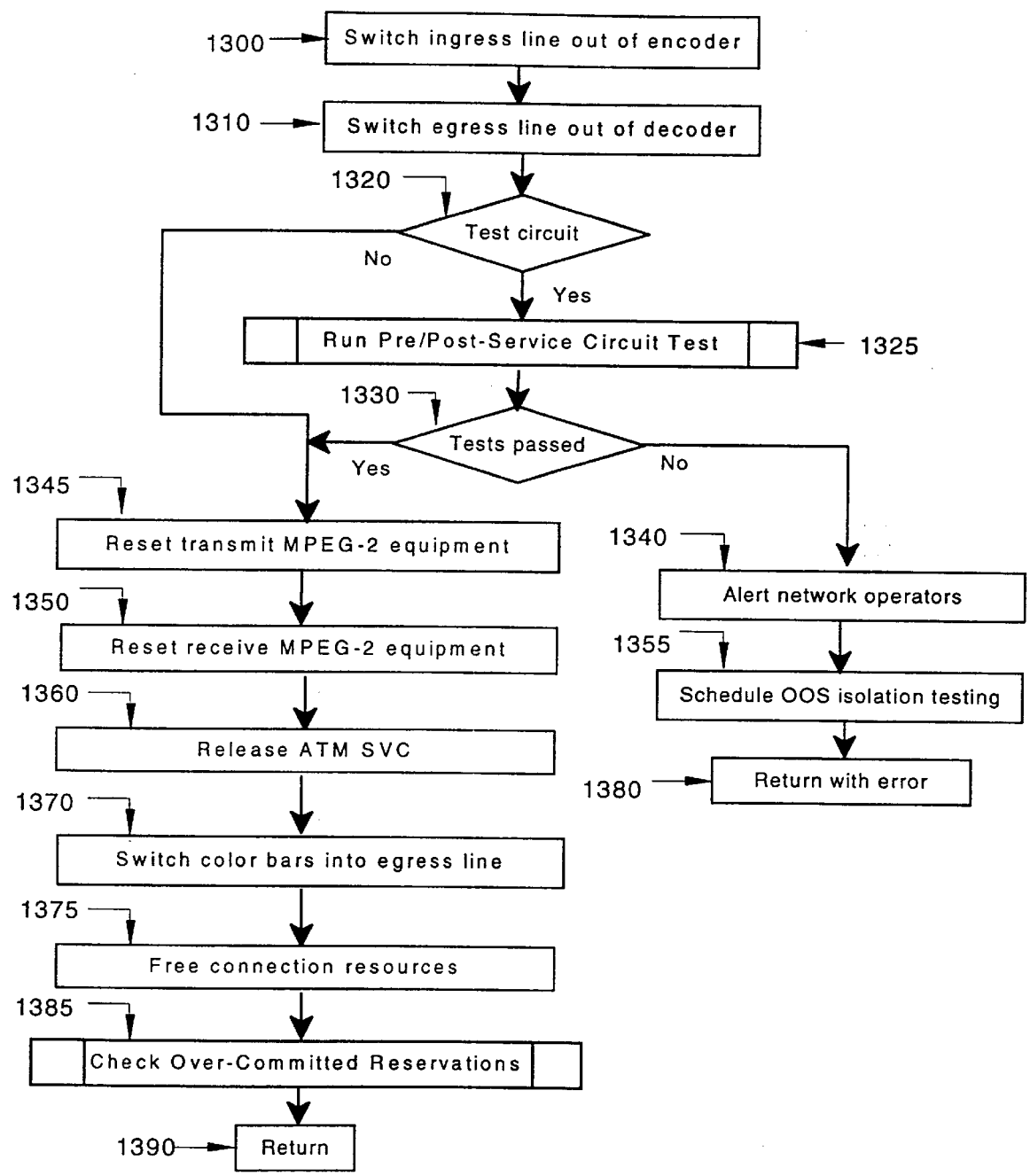
FIG. 17 is a logic flow diagram for breaking a video connection.

FIG. 17 illustrates a Break Connection routine used by the connection manager 814 to switch the subscriber's ingress and egress lines in blocks 1300 and 1310, respectively out of the circuit and tests to determine if the calling routine requested in block 1320 that the tests not be run. If tests were requested (the default) post-service tests are run in block 1325 to validate the quality of the circuit at the time of disconnect. In blocks 1330, 1345, and 1350, if the tests passed, the transmit and receive MPEG-2 hardware, respectively are reset to a quiesced state and the ATM switched virtual circuit connection is released in block 1360. A color bar test pattern 760 (See FIG. 7B) is switched in block 1370 into the egress line to allow the subscriber to test the access lines into the subscriber's premises. The resources used in make the connections are freed in block 1375 and a Check Over-Committed Reservations (to be described in FIG. 18) is called in block 1385 in case an over-committed reservation is waiting on resources. The routine then returns in block 1390 to block 1300. If the tests failed in block 1330, the network operator is alerted in block 1340, isolation testing is scheduled in block 1355 and an error code is returned in block 1380 to the caller.

Figure 18:
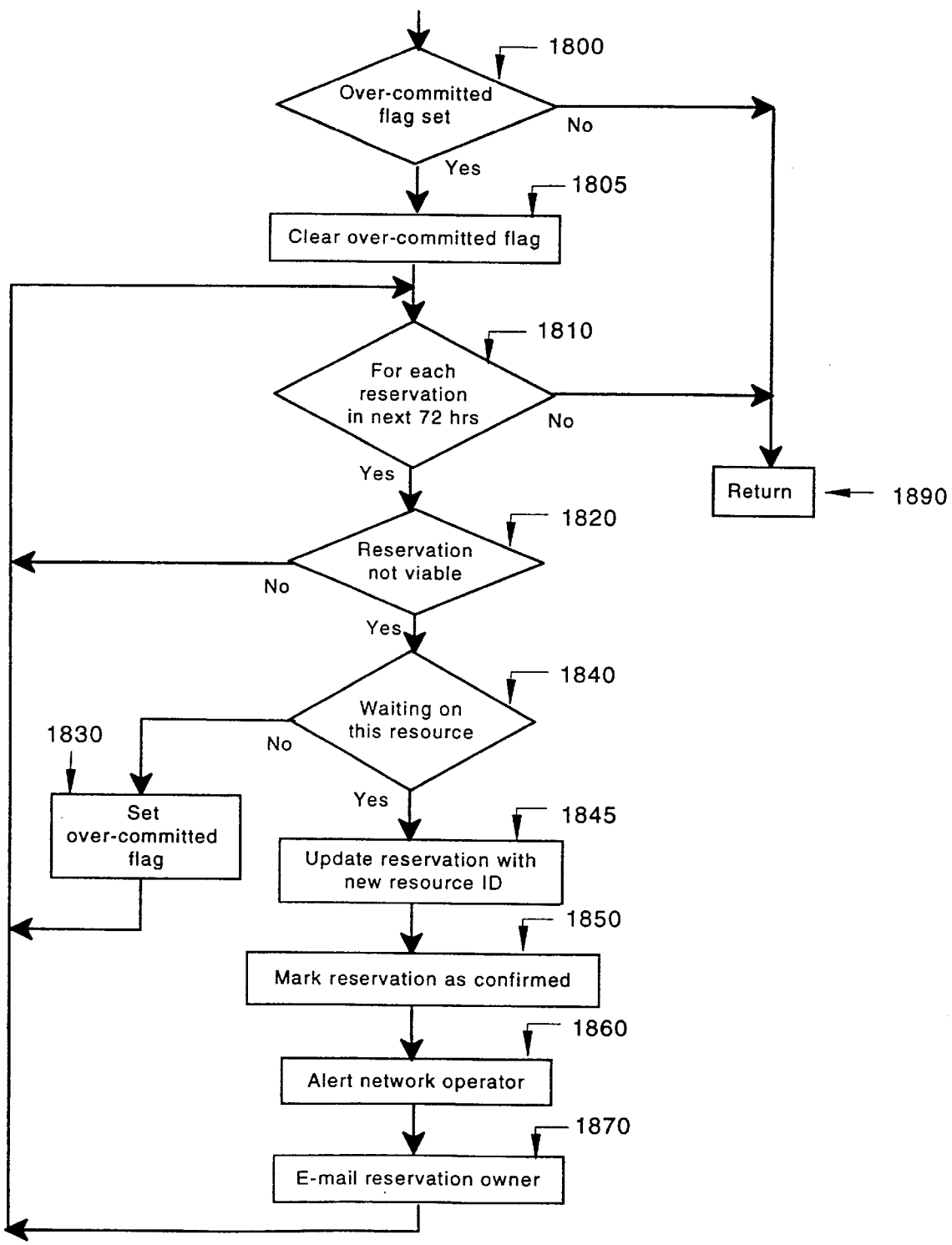
FIG. 18 is a logic flow diagram for checking for over-committed reservations.

In FIG. 18, a Check Over-Committed Reservations routine is called anytime resources are added to the network database 412 (See FIG. 4) by the OOS test executive 804 (See FIG. 6) or connections resources are freed. In block 1800, if there over-committed reservations, the over committed flag is reset in block 1805 and the routine falls into a loop to check the next 72 hours of reservations in block 1810 for non-viable status. If the status is non-viable in block 1820, then a check is made to see if the resource currently being returned satisfies the reservation in block 1840. If the reservation was waiting on the resource, the reservation is updated in block 1845 to use the resource and its status is modified to 'confirmed' in block 1850. The network operators are alerted in block 1860 and the subscriber is e-mailed in block 1870 with the reinstated confirmation. After processing all of the scheduled connections, the loop exits in block 1810 and in block the routine returns to the start block 1800. If reservations are found that are contingent on other resources in block 1840, an over-committed flag is set in block 1830 to ensure the A reservation gets automatically updated when the awaited resource becomes available.

Returning to FIG. 14 and OOS test request processing if isolation testing has not been scheduled in block 1520, the request by default is for Test Idle Resource routine which will now be described hereinafter.

Figure 19:
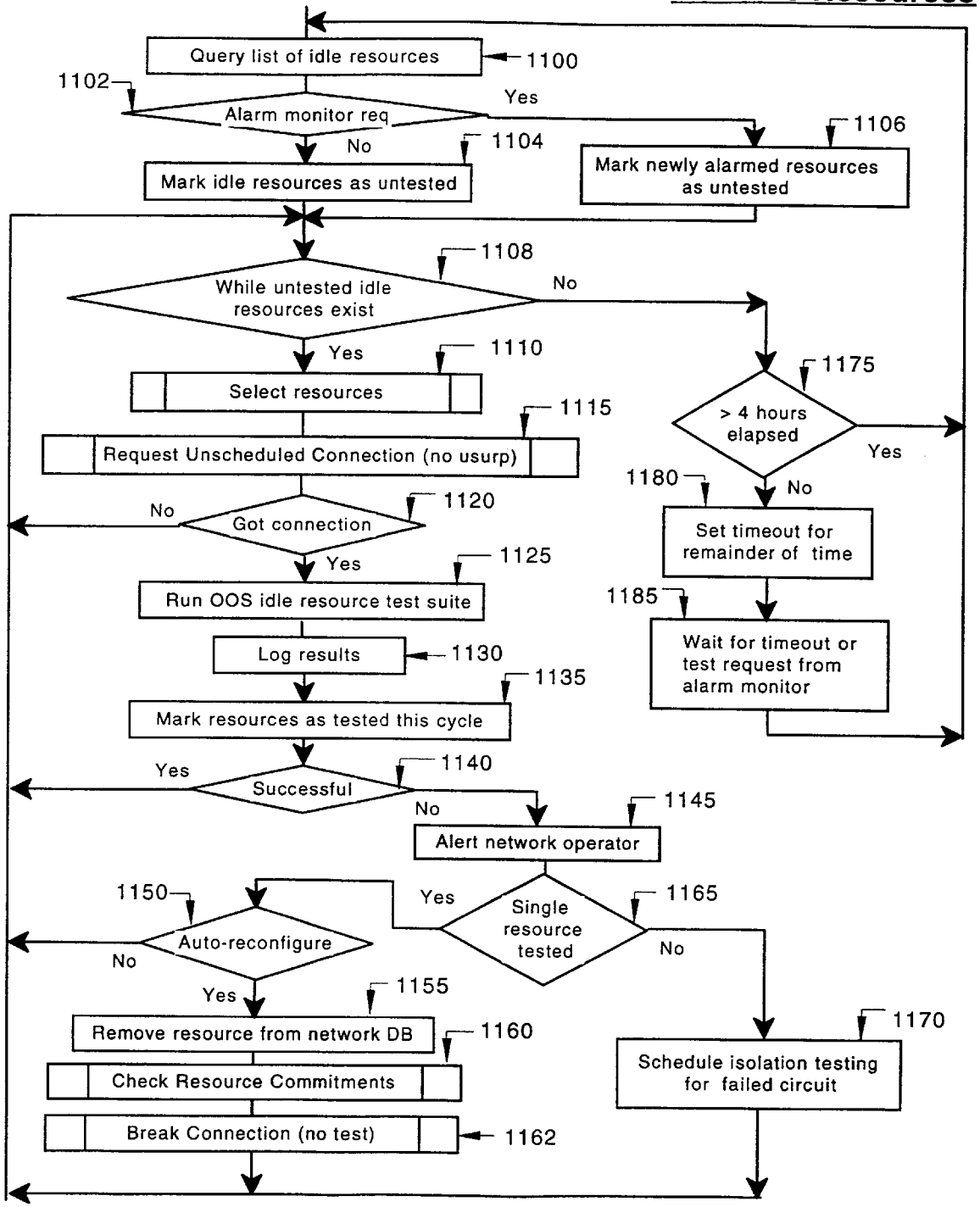
FIG. 19 is a logic flow diagram for out-of-service testing of idle resources.

FIG. 19 illustrates the Test Idle Resources routine which assures the availability of network resources. Periodically invoked a minimum of 4 times a day, the logic queries the list of all resources not currently in use in block 1100 and determines the reason for invocation in block 1102. If an idle testing timeout occurred, all idle resources are marked as untested in block 1104. Otherwise, a processing thread is dispatched by the alarm monitor 812 (See FIG. 6) in block 1102 and all resources with newly reported alarms are marked as untested in block 1106 and the logic falls into the main loop in block 1108 to initiate idle resource testing. In block 1110 a Select Resources subroutine is repeatedly called to provide a unique list of resource IDs that form an end-to-end video connection.

Figure 20:
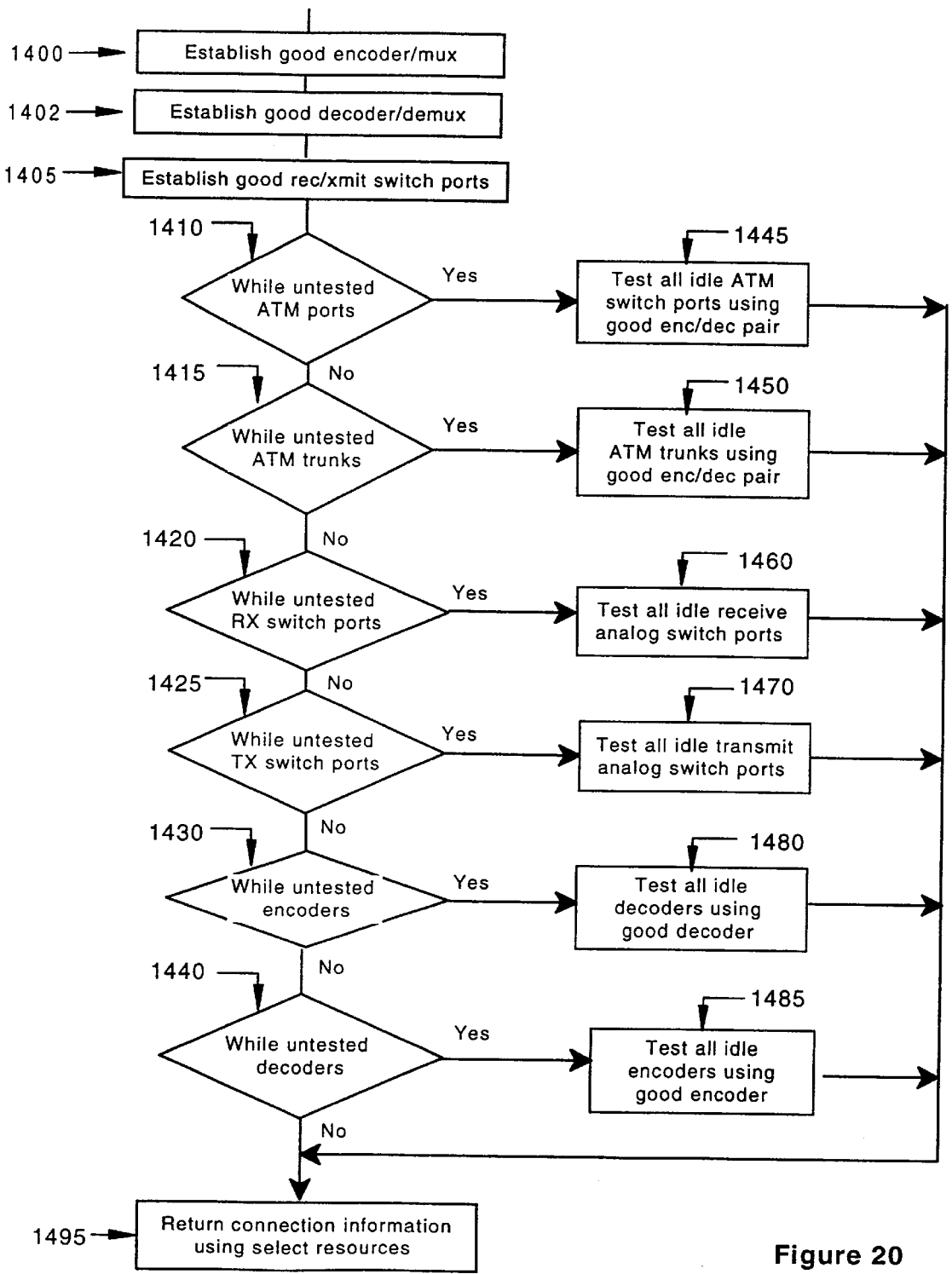
FIG. 20 is a logic flow diagram for selecting idle resources for the purposes of Out-Of-Service (OOS) testing.

Transferring to FIG. 20, the selection of idle resources begins with establishment of a set of known good resources, an encoder/mux, decoder/demux and analog/digital switch ports 1405 in blocks 1400, 1402, and 1405, respectively. The most recently idled hardware is selected as trusted resources. The trusted resources are used on every subsequent invocation of the OOS idle resource testing until they are no longer available because they have either malfunctioned or they are in use. At that time, the unavailable resource will replaced again by the last idled resource of its type. Once a functioning set of resources has been provisioned, all idle ATM switch ports are tested in block 1445 using the trusted encoder/decoder pair identified in block 1410. After looping through all of the idle ATM switch ports, all of the idle ATM trunk lines identified in block 1450 are likewise tested in block 1415. In block 1420, again using the same encoder/decoder pair, all of receive and transmit analog/digital switch ports are tested in serial fashion in blocks 1460 and 1470 using the trusted transmit and receive analog/digital switch ports. Then all idle decoders are tested in block 1480 using the known good transmit chain in block 1430. Idle resource testing concludes by checking the in block 1485 the encoders the trusted decoders in block 1440.

Returning to FIG. 19 and block 1115, an unscheduled connection request may fail if the resources that were selected for test were not available. Failures are not uncommon given that connections are continuously being established during idle testing. Network resources are not usurped during idle resource testing. If the requested unscheduled connection in the block 1115 is allocated in block 1120, the OOS idle resource test suite is run against that chain of resources in block 1125 and the results are logged in block 1130. Each resource provisioned in the connection is marked as tested in block 1135. If the OOS tests were successful in block 1140, the loop iterates to the next set of idle components. Otherwise, the network operators are alerted in block 1 145 and a test is made in block 1 165 to see if the resources selected for this test included just one previously untested component. If so, the failed component can be identified and if auto-reconfiguration is enabled in block 1150, the failed resource is removed from the network database 412 (See FIG. 4) in block 1155. Reservations are checked in block 1160 in case the resource had been committed. If a test in block 1145 involved more than one previously untested component, isolation testing is scheduled in block 1170 to determine the failing resource. The unscheduled connection is left intact to speed isolation and prevent the faulty resource from being used. The loop terminates when all idle resources have been tested. If more than 4 hours elapsed during the testing of idle resources in block 1175, the routine is once again invoked. Otherwise, a timeout is set for the balance of the remaining time in block 1180 and a processing thread of execution waits in block 1185 for either a timeout or a request from the alarm monitor to test idle resources in the alarm state. No attempt is made to test network resources that were freed after the idle test cycle had begun. Those freed resources were tested before the connection was broken.

In FIG. 21, a pre/post-service test component of the OOS test executive 804 (See FIG. 8) executes as a separate task in a detached processing thread of execution in order to respond rapidly to test requests prior to releasing a circuit to a subscriber. The thread runs a series of OOS video and audio tests to validate the connection. Subscribers may add other tests to this pre-service test suite to better assure circuit quality for their particular requirements. The task is halted in a wait state in block 1900 until dispatched with a test request. When the wait is satisfied, a loop is entered in block 1902 where each enqueued test request is processed. In blocks 1905 and 1915, a video test signal generator and an audio tone generator, respectively are switched into the connection by the analog/digital switch at the origin POP. Downstream, in blocks 1910 and 1920, video and audio analyzers, respectively are switched in to receive the generated test signals. In block 1930, a loop is initiated to execute the pre/post-service test suite. The test generators 112 and test analyzers 114 (See FIG. 1) are serially commanded in block 1935 to run each test in block 1938 and any failure that occurs in block 1940 results in the logging of the error data in block 1950, the normalization of the circuit in block 1960 and the appropriate error data are passed back to the caller in block 1970. In block 1930, if the test suite runs to completion without failure, the test equipment is removed from the circuit in block 1980 and an indication of success is returned.

Video Feed Monitor (VFM) Executive

Regardless of video test results, many engineers and operators insist on judging video quality subjectively by direct viewing of the live broadcast on a studio monitor at the receiving location. Viewing flesh tone, for example, gives an engineer a good idea of relative video quality. This is not possible in the IVS network since the POPs are unmanned. To enable the monitoring of live video of all active circuits, the VFM splits the signal off in the analog/digital switch at the receiving POP and routes it back through the network to the CAC where it is viewed by an operator. Fixed circuits are established from each POP to the CAC for monitoring purposes. The VFM cycles through each connection in the network, routing each one back to the CAC for viewing on a single studio monitor for a period of 15 seconds, allowing CAC personnel to quality assure 4 connections per minute per monitor.

Figure 22B:
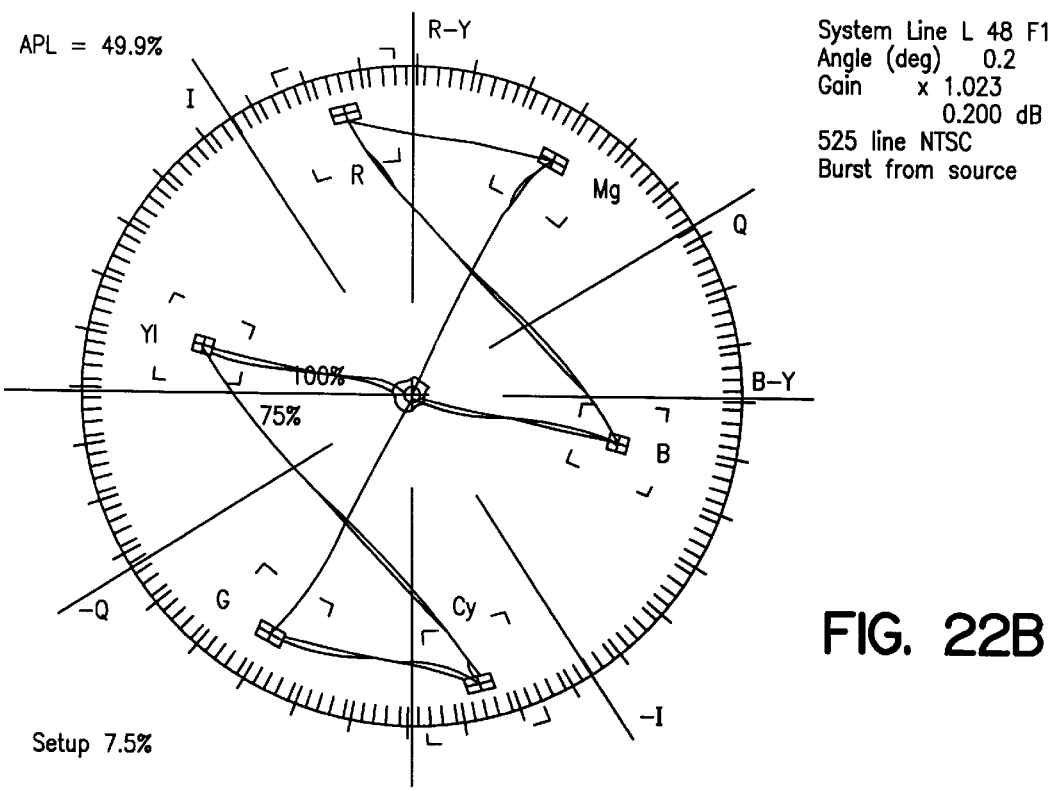
FIG. 22B is an illustration of the display output of a vectorscope.
Figure 22A:
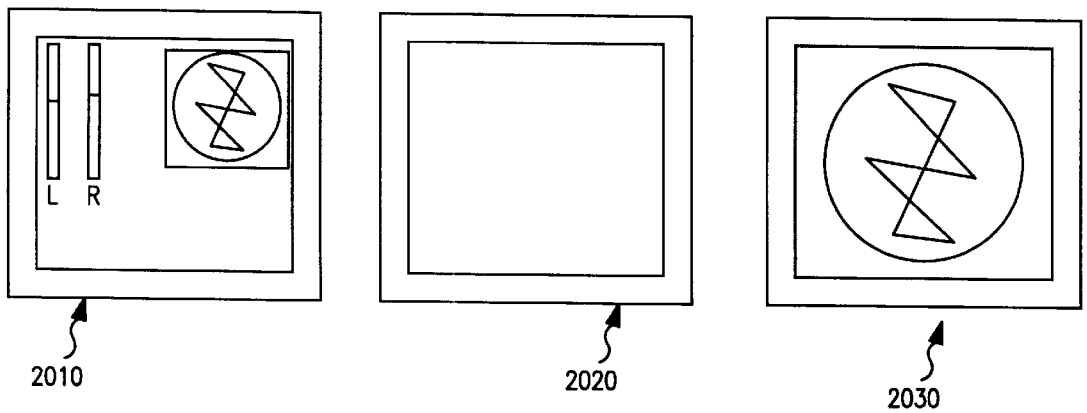
FIG. 22A is a representation of video screens on a studio monitor at a Command And Control (CAC) center for live monitoring purposes.

In FIG. 22A, using a character generator, the origin and destination port ID, reservation ID and subscriber name are overlaid in small characters into the lower portion of the video and viewed on the studio monitor 2220 to identify the feed. In addition, the VFM output can be recorded for later review. The VFM stops and starts VTR recording of the video feed by commands from either the operator or alarm monitor.

The video is also routed to a companion waveform monitor/vectorscope 2030 to perform an analysis of the live video. The vectorscope measures phase over amplitude and amplitude over time to indicate the relative quality of the color and black/white components. The network operators can assess the health of the circuit at a glance using this device.

FIG. 22B is a vectorscope display output of a well-known vector generated by the color bar test pattern 760 (See FIG. 7B). Display outputs are continuously logged. The video seen at the CAC is of a lower quality than what is seen at the customer's location since it transverses the network twice and therefore undergoes cascaded compression. However the monitored signal does give the operator a relative indication of video and audio quality. If video problems are detected, the operator can instruct the VFM to switch the feed through a vector test set configured at the POP that overlays a vector of the video and the audio levels onto the video feed shown in the monitor screen 2010 (See FIG. 22A). Alternatively, the operator can instruct the VFM to add a multipoint drop to the switched ATM connection to decode the original signal. This effectively isolates the problem to the either the transmitting POP or the receiving POP.

Figure 23:
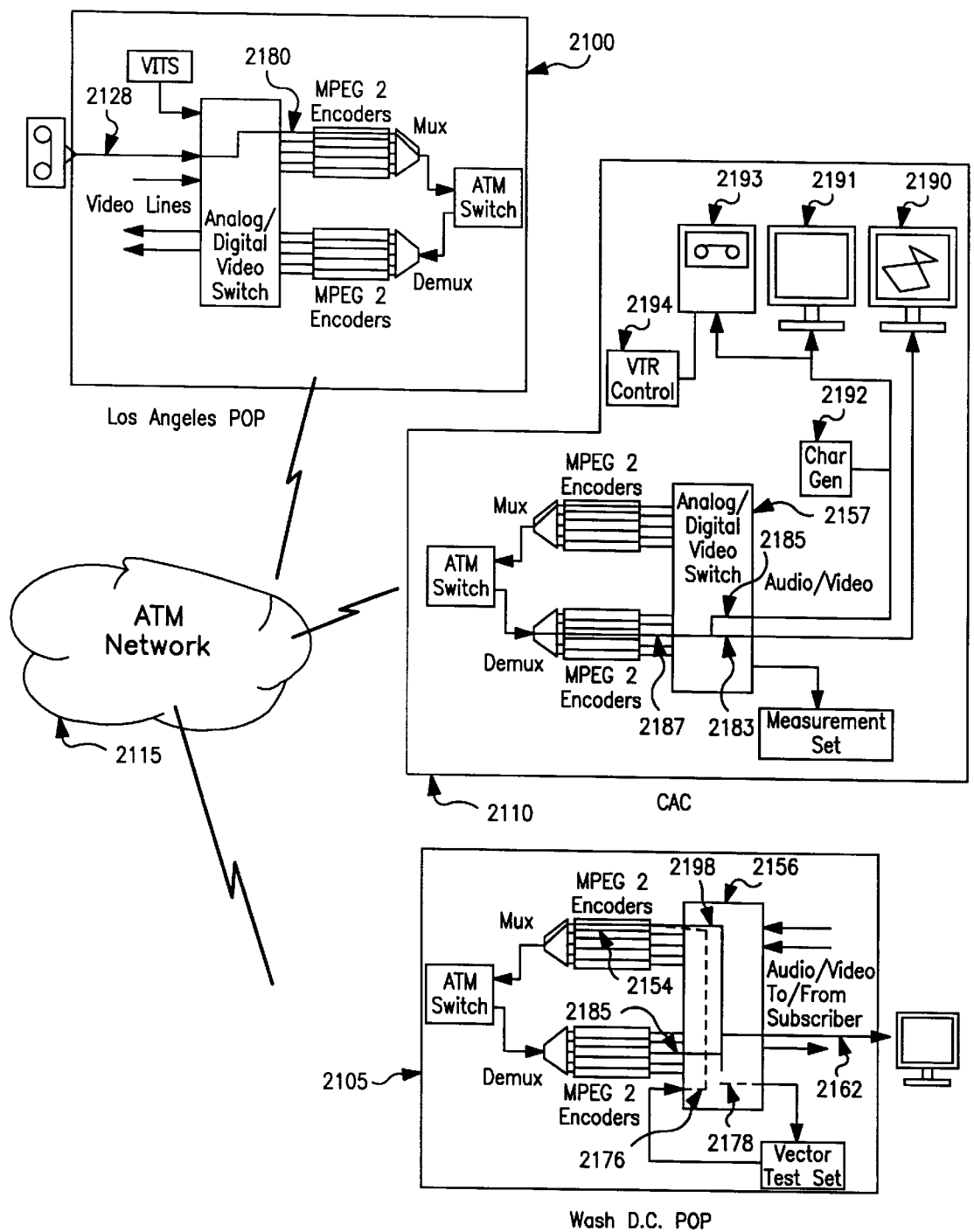
FIG. 23 is a diagram of the network with a video circuit being monitored by a Video Feed Monitor (VFM).

FIG. 23 contains a network diagram of a video feed monitored by the VFM. The feed originates in Los Angeles 2100 and terminates in Washington DC 2105. At the analog/digital switch 2156 in the Washington DC CAC, the received video signal 2185 is split off in the analog/digital switch 2198 to feed an encoder 2154 assigned to a fixed VFM circuit for monitoring. Inside the CAC POP 2110, the analog/digital switch 2157 splits the received video signal 2187 into two outbound ports 2185 2183 to route the video/audio to a studio monitor 2190 and a waveform monitor/vectorscope 2191. The character generates 2192 provides on-screen text to identify the feed being monitored. The video tape recorder (VTR) 2193 permits operators to record the snapshots of each feed. The VTR is controlled via a VTR controller 2194 that is attached to the network test manager 431. To view the vector waveform of the video as received at the destination POP, a normal return path 2198 is broken and a vector test set 2170 is switched into a circuit 2178. The vector test set overlays the vector waveform and a graphic of the received audio levels onto the video feed and the test set then injects a signal 2176 back into the analog/digital switch 2156 where it is routed to the CAC.

Figure 24:
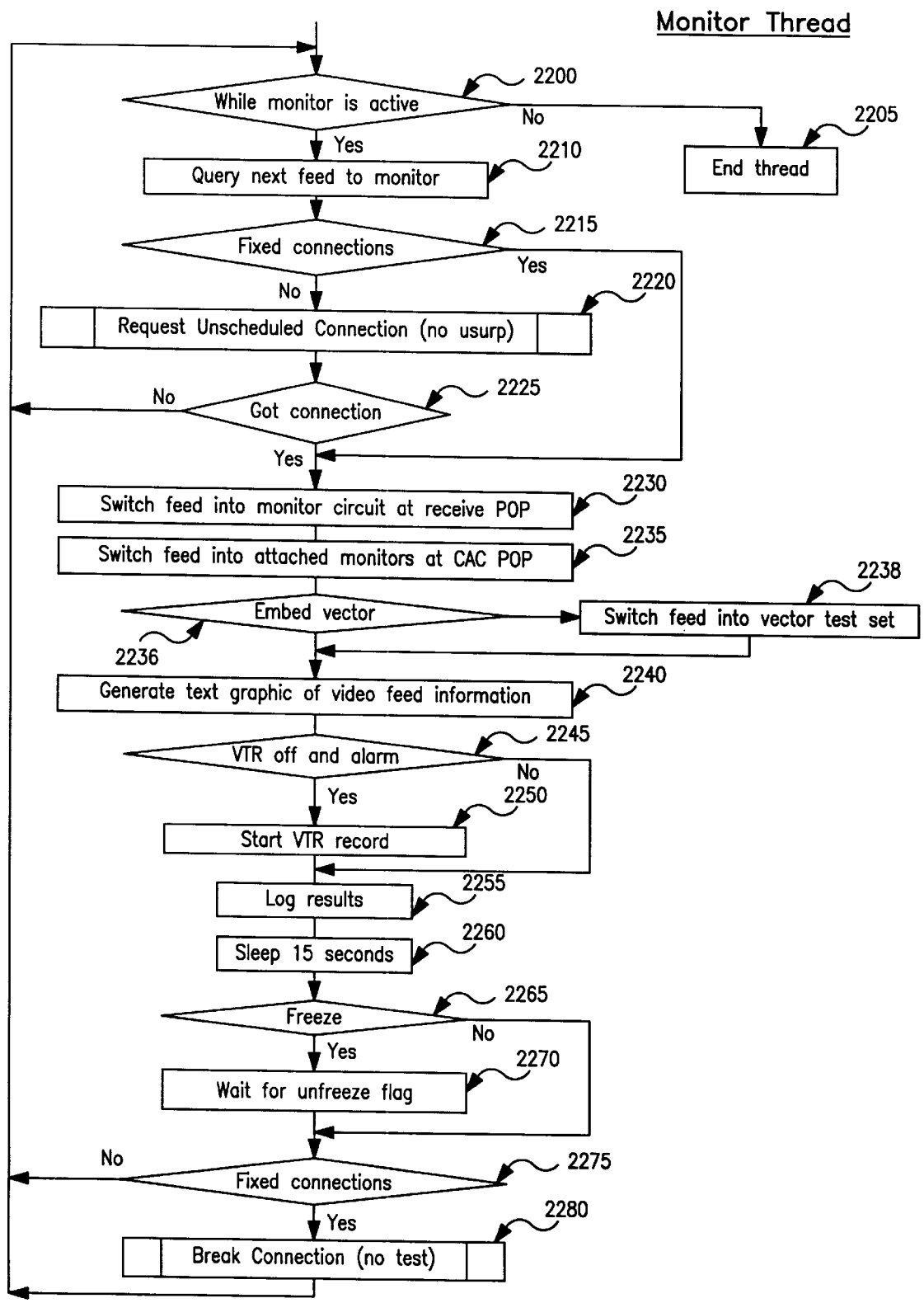
FIG. 24 is a logic flow diagram for the main processing thread of the VFM of FIG. 23.

In FIG. 24, each studio monitor and waveform monitor/vectorscope set has its own dedicated processing thread of execution inside the VFM. The thread remains active in a block 2200 of a loop until the monitors are unconfigured at which time the thread is ended in block 2205. The next video feed to monitor is queried in block 2210 and if fixed monitoring circuits are not being used in block 2215, an unscheduled connection is established to route the video in block 2220 into the CAC. The default is to use fixed connections unless the network is low on resources. If the connection is made in block 2225, the switch at the receiving POP is commanded in block 2230 to route the video back into the VFM circuit. The analog/digital switch inside the CAC's POP 439 (See FIG. 4) splits the video signal in block 2235 into two paths to feed the pair of monitors. If the vector waveform is to be inserted into the feed in block 2245, the video is switched into the vector test set in block 2238. The subscriber's name, reservation ID and ingress/egress ports are displayed at the bottom of the screen (See FIG. 22A) in block 2240 using the character generator. If the alarm monitor 812 is reporting an alarm on any resource used in this circuit and the video tape recorder is not recording in block 2245, the VTR is put into record mode in block 2250 for the duration of this feed. The waveform monitor then captures the waveform and in block 2255 logs it and the processing thread in block 2260 halts execution for 15 seconds to give the operators time to view the feed. If the network operator commands the VFM to freeze the feed in block 2265, the thread is halted until an unfreeze command is received in block 2270. Otherwise, the VFM connection is removed in block 2280 if it was not fixed in block 2270 and the loop iterates to the next video feed.

Figure 25:
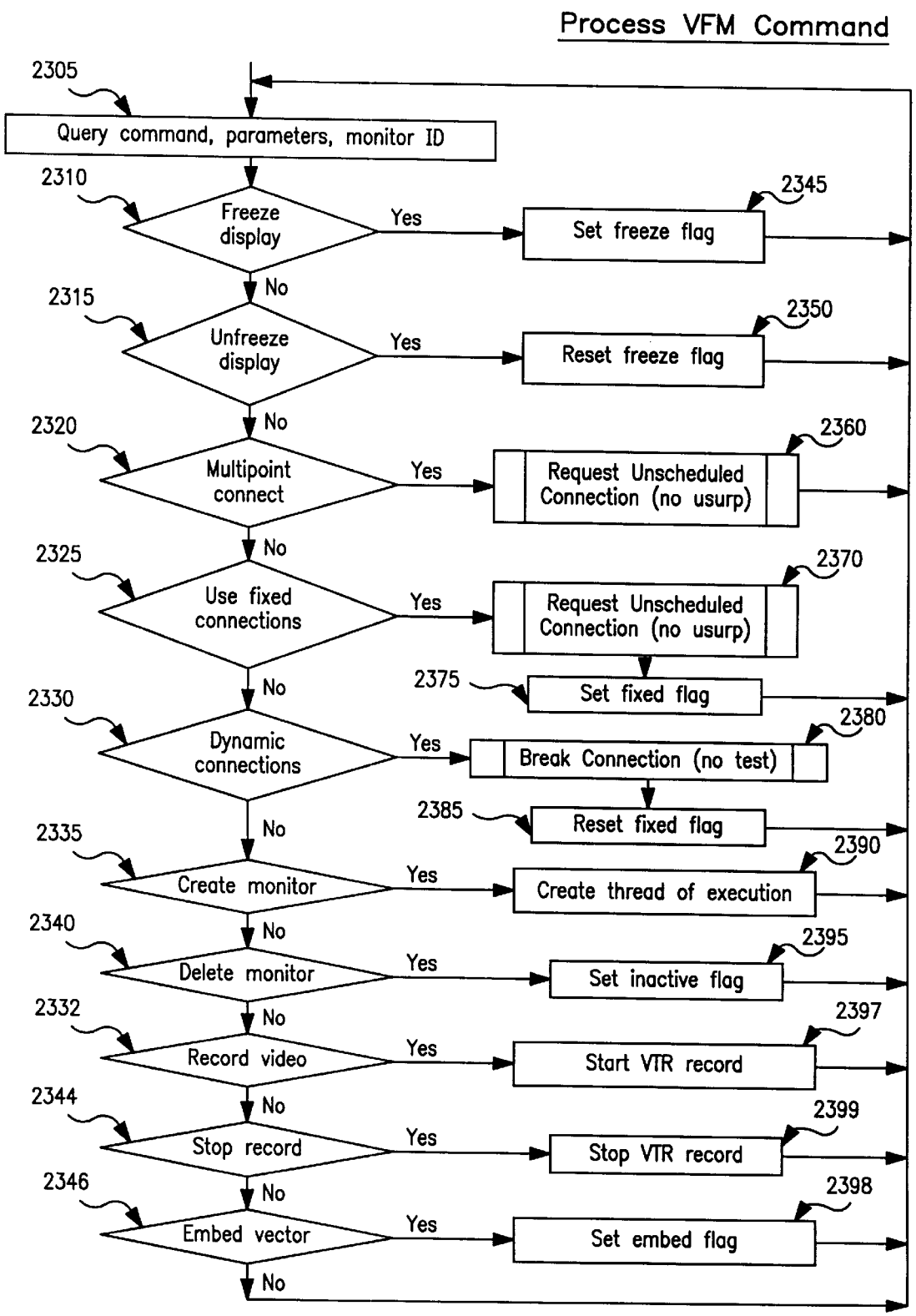
FIG. 25 is a logic flow diagram for processing operator commands to the VFM.

In FIG. 25, the VFM is controlled through the manual test console 435 (see FIG. 4). After decoding the command in block 2305, if the command is to freeze in block 2310 or unfreeze in block 2315, an appropriate freeze flag is set in blocks 2345 and 2350. A multipoint request in block 2320 is used to isolate quality problems results in an additional circuit being added by an unscheduled connection in block 2360 to monitor the feed directly. When using fixed connections in block 2325 a unscheduled request for a fixed VFM circuit is created in block 2370 and the fixed flag is set in block 2375. Reverting to dynamic connections in block 2330, the fixed VFM connection is broken in block 2380 and the fixed flag is reset in block 2385. Creating a new processing thread to configure an extra waveform monitor/vectorscope in block 2340 causes a new VFM monitor thread to be spawned in block 2390. Removing a monitor in block 2345 resets the active flag in block 2395 which will cause the VFM thread to end. If the operator starts or stops VTR recording of the feeds in blocks 2332 and 2334, respectively, the VTR is commanded to start or stop recording in blocks 2397 and 2399, respectively via the VTR controller. The command to embed the vector waveform of the received video signal into the feed in block 2346 results in the embed flag being set in block 2398.

Figure 26:
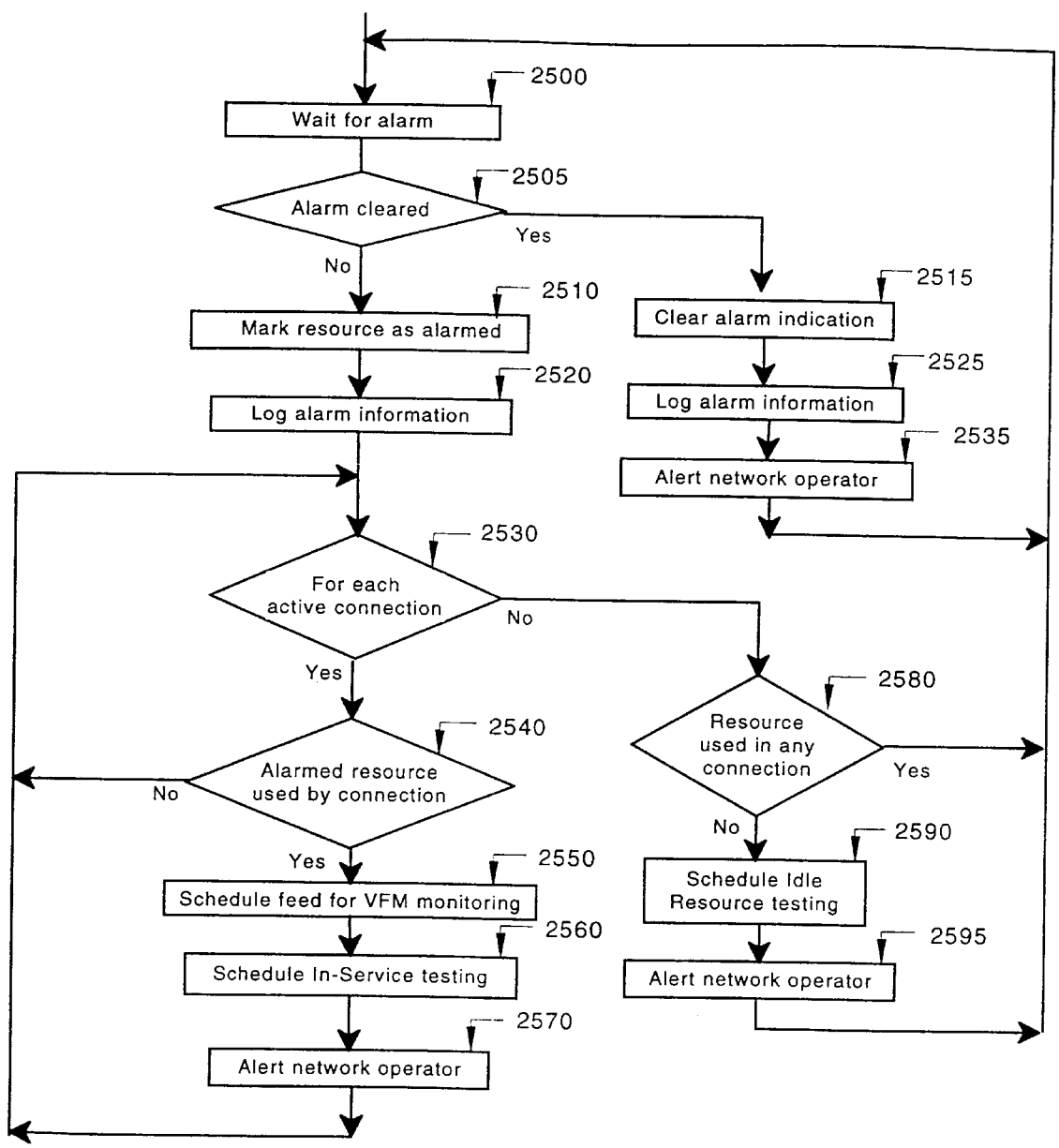
FIG. 26 is a logic flow diagram of the alarm monitor.

FIG. 26 shows the logic flow of the alarm monitor 812 (See FIG. 8) which invokes the VFM, OOS and IS test executives in response to alarms received from the POPs. In block 2500, the alarm monitor thread waits on alarms which are reported over the IP WAN network as SNMP traps messages. If the alarm message indicates an alarm condition was cleared in block 2505, the resource alarm indication is cleared in block 2515, the information is logged in block 2525 and a message is sent to the operator console to inform the network operator in block 2435. In block 2505, if the message was a new alarm, the resource is marked as alarmed in block 2510 and the pertinent information is logged in block 2520. Then each active connection is examined in block 2530 to determine in block 2540 if the alarmed resource is being used in the connection. If so, the video feed is scheduled for VFM monitoring in block 2550 and in-service testing in block 2560. The operator is notified in block 2570 and the loop iterates. When the loop exits in block 2530, a test in block 2580 is made to see if any of the active connections were affected by the alarming resource. If not, the test means that the alarm occurred on an idle resource so idle resource testing is scheduled in block 2590, the operator is alerted in block 2595, and the processing thread then reenters the wait state in block 2500.

Although the preferred embodiment has been disclosed, it will be understood by those skilled in the art that changes can be made to this specific embodiment without departing from the spirit and scope of the invention. Furthermore, this embodiment is for the purpose of example and illustration only and is not to be taken to limit the scope of the invention or narrow the scope of the appended claims.

We claim:

1. A switched digital broadcast network having real-time encoding and decoding of video signals for multi-point routing in an ATM network and automated central control and testing of the video signals with a high level of security and protection of signal content, comprising:

a switch packet network having multiple gateways, each gateway receiving video signals in analog form from a plurality of video signal sources and comprising:

an analog/digital video switch coupled to an encoder for receiving and distributing the video signals in packet form;

a multiplexer coupled to the encoder for inserting the digital packets into the ATM network through a digital switch, the digital switch and multiplexer encoding destination address information into the digital packets to ensure proper routing;

a de-multiplexer and decoder coupled to the digital switch for receiving and separating the digital packets from the digital switch into individual video streams subsequently decoded into analog video for distribution to the video sinks through the analog/digital video switch; and a network test manager including an in-service test executive, an out of service test executive, and a video feed monitor running continuously for automated central control of all aspect of network testing and monitoring of the video signals; each of the test executives controllable from a manual test console.

2. The switched digital broadcast network of claim 1 further comprising an automated central command and control center coupled to the gateways for executing remote in service and out of service testing of the video signals to ensure the quality, availability and content of video traffic to the video sources and sinks.

3. The switched digital broadcast network of claim 1 further comprising:
   a command and control center coupled to the ATM network and including test executives which ensure the quality and availability of video traffic.

4. The switched digital broadcast network of claim 3 wherein the test executives continuously run without manual intervention providing network operators with network status through user consoles.

5. The switched digital broadcast network of claim 3 further comprising:
   a network test manager including an in-service test executive, an out of service test executive, and a video feed monitor running continuously to control all aspect of network testing and monitoring; each of the test executives controllable from a manual test console.

6. The switched digital broadcast network of claim 3 further comprising:
   a test controller for serializing access of the test executives to the network;
   a connection manager interfacing with the out of service test executive to test new connections before being released to a subscriber; and
   a resource manager maintaining a database of all network resources available to be used for future video connections.

7. The switched digital broadcast network of claim 3 wherein the test executives performing periodic in-service testing of active video feeds in a non-invasive, non-service affecting manner.

8. The switched digital broadcast network of claim 3 wherein the test executives automatically re-configuring network circuits to restore service to video feeds which fail in-service testing.

9. The switched digital broadcast network of claim 3 wherein the test executives update network resources and reservation databases as components of the network malfunction or undergo repair.

10. In a switched digital broadcast network, an in-service test executive comprising;
    timing means for generating an in-service test interval for the network;
    means for responding to an alarm monitor to determine the cause of the alarm within the test interval;
    means for querying a list of all active connections in the network from a resource manager;
    means for performing in-service testing of each connection and storing the results;
    means for automatically reconfiguring the network for failed connections requesting a new connection for subscribers on a failed connection; and
    means for checking the timing means to determine whether periodic in-service testing of the network connection should begin.

11. In a switched digital broadcast network, an out-of-service test executive comprising;
    means for receiving out-of-service requests for network equipment testing;
    means for determining whether the request is for testing equipment subsequent to a new installation or maintenance testing;
    means for notifying network operator of network equipment failing out-of-service testing;
    means for adding network equipment to the network for successfully passing out-of-service testing;
    means for checking reservation for the network equipment successfully passing out-of-service testing; and
    means for logging test results in an operator console.

12. In a switched digital broadcast network, a gateway comprising: real-time encoding and decoding of video signals for multi-point routing through connections in an ATM network, an analog/digital video switch coupled to an encoder for receiving and distributing the video signals in packet form, a multiplexer coupled to an encoder for inserting the digital packets into the ATM network through a digital switch, a de-multiplexer and decoder coupled to the digital switch for receiving and separating the digital packets from the digital switch into individual video streams; and an automated central control including test executives, a method of testing network connections using a test executive, comprising the steps of:
    generating an in-service test interval for the network;
    responding to an alarm monitor to determine the cause of the alarm; querying a list of all active connections in the network from a resource manager;
    performing in-service testing of each connection and storing the results;
    automatically reconfiguring the network for failed connections or requesting a new connection for subscribers on a failed connection; and
    checking the timing means to determine whether periodic in-service testing of the network connection should begin.

13. The method of claim 12 further using a test executive to perform out-of-service testing, comprising the steps of:
    receiving out-of-service requests for network equipment testing;
    determining whether the request is for testing equipment subsequent to a new installation or maintenance testing;
    notifying network operator of network equipment;
    failing out-of-service testing;
    adding network equipment to the network for successfully passing out-of-service testing;
    checking reservation for the network equipment successfully passing out-of-service testing; and
    logging test results in an operator console.

14. The method of claim 12 further checking network resource commitments in a test executive, comprising the steps of:
    examining all network resource reservations for a selected period;
    determining if a resource to be removed from the network is dedicated to a reservation;
    determining if another resource is available;
    setting an overcommitted flag if another resource is not available;
    updating reservation with new resource if new resource available.

15. The method of claim 12 further checking over committed reservations in a test executive, comprising the steps of:
    determining if an overcommitted flag has been set;
    clearing over committed flag;
    determining if a reservation is viable;

checking a resource being returned satisfies a reservation waiting for a resource;

setting an overcommitted flag to ensure a reservation gets automatically updated when an awaited resource becomes available;

updating reservation waiting for a resource with new resource ID; and notifying requester of new reservation.

16. The method of claim 12 further processing commands to a video feed monitor test executive, comprising the steps of:

decoding command;

determining to freeze or unfreeze a monitor display;

using a multipoint request to isolate connection quality problems by adding an unscheduled connection to monitor video feed directly;

creating an unscheduled request for a fixed Video Feed Monitor (VFM) when using a fixed connection and setting a fixed flag;

reverting to dynamic connections and breaking the fixed VFM connection, after which the fixed flag is rest;

creating a new processing thread to configure an extra waveform; and removing a VFM resets an active flag and causing the VFM thread to end.

17. A medium, executable in a computer system, for testing network connections in a switched digital broadcast network using a test executive, comprising:

program instructions generating an in-service test interval for the network;

program instructions responding to an alarm monitor to determine the cause of the alarm; program instructions querying a list of all active connections in the network from a resource manager;

program instructions performing in-service testing of each connection and storing the results;

program instructions automatically reconfiguring the network for failed connections or; program instructions requesting a new connection for subscribers on a failed connection; and program instructions checking the timing means to determine whether periodic in-service testing of the network connection should begin.

18. The medium of claim 17 further using a test executive to perform out-of-service testing, comprising:

program instructions receiving out-of-service requests for network equipment testing;

program instructions determining whether the request is for testing equipment subsequent to a new installation or maintenance testing;

program instructions notifying network operator of network equipment failing out-of-service testing;

program instructions adding network equipment to the network for successfully passing out-of-service testing;

program instructions checking reservation for the network equipment successfully passing out-of-service testing; and program instructions logging test results in an operator console.

19. The medium of claim 17 further checking network resource commitments in a test executive, comprising:

program instructions examining all network resource reservations for a selected period;

program instructions determining if a resource to be removed from the network is dedicated to a reservation;

program instructions determining if another resource is available;

program instructions setting an over committed flag if another resource is not available; and program instructions updating reservation with new resource if new resource available.

20. The medium of claim 17 further checking over committed reservations in a test executive, comprising:

program instructions determining if an over committed flag has been set;

program instructions clearing over committed flag;

program instructions determining if a reservation is viable;

program instructions checking a resource being returned satisfies a reservation waiting for a resource;

program instructions setting an over committed flag to ensure a reservation gets automatically updated when an awaited resource becomes available;

program instructions updating reservation waiting for a resource with new resource ID; and program instructions notifying requester of new reservation.

21. The medium of claim 17 further processing commands to a video feed monitor test executive, comprising:

program instructions decoding a command;

program instructions determining to freeze or unfreeze a monitor display;

program instructions using a multipoint request to isolate connection quality problems by adding an unscheduled connection to monitor video feed directly;

program instructions creating an unscheduled request for a fixed Video Feed Monitor (VFM) when using a fixed connection and setting a fixed flag;

program instructions reverting to dynamic connections and breaking the fixed VFM connection, after which the fixed flag is rest;

program instructions creating a new processing thread to configure an extra waveform; and program instructions removing a VFM resets an active flag and causing the VFM thread to end.

* * * * *